(12) United States Patent
Zhao et al.

(10) Patent No.: US 10,911,788 B2
(45) Date of Patent: Feb. 2, 2021

(54) VIDEO IMAGE CODING AND DECODING METHOD AND APPARATUS

(71) Applicant: HUAWEI TECHNOLOGIES CO., LTD., Guangdong (CN)

(72) Inventors: Yin Zhao, Hangzhou (CN); Haitao Yang, Shenzhen (CN); Shan Gao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/689,550

(22) Filed: Nov. 20, 2019

(65) Prior Publication Data

US 2020/0092587 A1    Mar. 19, 2020

Related U.S. Application Data

(63) Continuation of application No. PCT/CN2018/079658, filed on Mar. 20, 2018.

(30) Foreign Application Priority Data

May 27, 2017    (CN) .......................... 2017 1 0392690

(51) Int. Cl.
| | |
|---|---|
| H04N 19/96 | (2014.01) |
| H04N 19/147 | (2014.01) |
| H04N 19/157 | (2014.01) |
| H04N 19/182 | (2014.01) |
| H04N 19/70 | (2014.01) |

(52) U.S. Cl.
CPC .......... *H04N 19/96* (2014.11); *H04N 19/147* (2014.11); *H04N 19/157* (2014.11); *H04N 19/182* (2014.11); *H04N 19/70* (2014.11)

(58) Field of Classification Search
CPC .... H04N 19/96; H04N 19/147; H04N 19/157; H04N 19/182; H04N 19/70
See application file for complete search history.

(56) References Cited

U.S. PATENT DOCUMENTS 9,467,707 B2 * 10/2016 Rapaka ................. H04N 19/17
10,652,536 B2 * 5/2020 Lim ..................... H04N 19/119
(Continued)

FOREIGN PATENT DOCUMENTS

| | | |
|---|---|---|
| CN | 103442235 A | 12/2013 |
| CN | 103780910 A | 5/2014 |
| WO | 2016148438 A2 | 9/2016 |

OTHER PUBLICATIONS

ITU-T H.265(Dec. 2016), Series H: Audiovisual and Multimedia Systems, Infrastructure of audiovisual services—Coding of moving video, High efficiency video coding, Dec. 2016. total 664 pages.

(Continued)

*Primary Examiner* — James M Pontius
(74) *Attorney, Agent, or Firm* — Westerman, Hattori, Daniels & Adrian, LLP

(57) ABSTRACT

A video image decoding method for parsing split mode information of a coding tree node in a bitstream, obtaining a split mode of the coding tree node from a candidate split mode set of the coding tree node based on the split mode information, parsing the bitstream to obtain coding information of the coding tree node, and reconstructing a pixel value of the coding tree node based on the split mode information and the coding information of the coding tree node.

20 Claims, 10 Drawing Sheets

(56) References Cited

U.S. PATENT DOCUMENTS

| | | | |
|---|---|---|---|
| 2012/0106622 A1 | 5/2012 | Huang et al. | |
| 2014/0086333 A1* | 3/2014 | Wang | H04N 21/8451 |
| | | | 375/240.25 |
| 2016/0156907 A1 | 6/2016 | Liang et al. | |
| 2018/0070110 A1* | 3/2018 | Chuang | H04N 19/134 |
| 2018/0139453 A1 | 5/2018 | Park et al. | |
| 2018/0217854 A1* | 8/2018 | Lee | G06F 3/04886 |
| 2019/0182498 A1* | 6/2019 | Yamamoto | H04N 19/186 |
| 2019/0364279 A1* | 11/2019 | Yasugi | H04N 19/119 |
| 2020/0137398 A1* | 4/2020 | Zhao | H04N 19/137 |
| 2020/0137424 A1* | 4/2020 | Zhao | H04N 19/119 |
| 2020/0195970 A1* | 6/2020 | Ikai | H04N 9/77 |
| 2020/0221140 A1* | 7/2020 | Zhao | H04N 19/176 |
| 2020/0236359 A1* | 7/2020 | Gao | H04N 19/136 |
| 2020/0275132 A1* | 8/2020 | Kanoh | H04N 19/159 |
| 2020/0288159 A1* | 9/2020 | Van der Auwera | H04N 19/82 |

OTHER PUBLICATIONS

International Search Report and Written Opinion dated Jun. 5, 2018, issued in counterpart Application No. PCT/CN2018/079658, with English translation. (67 pages).

* cited by examiner

VIDEO IMAGE CODING AND DECODING METHOD AND APPARATUS

CROSS-REFERENCE TO RELATED APPLICATIONS

This application is a continuation of International Application No. PCT/CN2018/079658, filed on Mar. 20, 2018, which claims priority to Chinese Patent Application No. 201710392690.3, filed on May 27, 2017. The disclosures of the aforementioned applications are hereby incorporated by reference in their entireties.

TECHNICAL FIELD

This application relates to the field of video image technologies, and in particular, to a video image coding and decoding method and apparatus.

BACKGROUND

In an H.265 video coding standard, one frame of image is split into coding tree units (CTU) that do not overlap each other, a quadtree (QT)-based CTU split method is used, a CTU is used as a root node of the quadtree, and the CTU is recursively split into several leaf nodes in a quadtree split mode. One node is corresponding to one image area. If the node is not split, the node is referred to as a leaf node, and the image area corresponding to the node forms a coding unit (CU). If the node continues to be split, the image area corresponding to the node is split into four equal-sized areas (a length and a width of each of the four equal-sized areas are half of a length and a width of a split area). Each area is corresponding to a node, and there is a need to determine whether the node is further split.

In a QT structure in H.265, only square CUs of different sizes can be generated, and consequently the CU cannot be well adapted to textures of various shapes.

A binary tree (BT)-based coding split mode is added to a joint exploration team on future video coding (Joint Exploration team on Future Video Coding, JVET) joint exploration model (JEM), to be specific, a node may continue to be split into two nodes in a binary tree manner.

Binary tree split and quadtree split may be cascaded, which is referred to as a QTBT split mode for short. For example, the CTU is first split in a QT manner, and a leaf node of a QT can still be split in a BT manner. In this manner, in addition to a square CU, a rectangular CU can be generated in the BT manner. However, one node is split into two nodes of a ½ size during one-time BT split, and if a node needs to be split into CUs of a smaller size, there are excessive split levels. In addition, in the manner of cascading a QT and a BT, to be specific, the leaf node of the QT is split in the BT manner, and a leaf node of a BT cannot be split in the QT manner.

SUMMARY

Embodiments of this application provide a video image coding and decoding method and apparatus, so as to improve coding and decoding compression efficiency.

The specific technical solutions provided in the embodiments of this application are as follows:

According to a first aspect, a video image decoding method is provided, where a coding tree node is used to indicate a to-be-decoded rectangular image area in a video image, a lower-level node is used to indicate a part of the to-be-decoded rectangular image area, image areas indicated by different lower-level nodes do not overlap each other, and when the coding tree node is a coding unit of the video image, the coding tree node does not include the lower-level node; and the method includes:

parsing split mode information of the coding tree node in a bitstream;

obtaining a split mode of the coding tree node from a candidate split mode set of the coding tree node based on the split mode information, where an aspect ratio of the coding tree node is 1 and a width of the coding tree node is greater than a preset threshold, the candidate split mode set includes a first split mode for indicating that the coding tree node is the coding unit of the video image, a second split mode for determining that the coding tree node includes two equal-sized lower-level nodes with an aspect ratio of 2, a third split mode for determining that the coding tree node includes two equal-sized lower-level nodes with an aspect ratio of 0.5, and a fourth split mode for determining that the coding tree node includes four equal-sized lower-level nodes with an aspect ratio of 1, and when an aspect ratio of the lower-level node is 1 and a width of the lower-level node is greater than the preset threshold, a candidate split mode set of the lower-level node is the same as the candidate split mode set of the coding tree node;

parsing the bitstream to obtain coding information of the coding tree node; and reconstructing a pixel value of the coding tree node based on the split mode information and the coding information of the coding tree node.

The beneficial effects are as follows: In the foregoing decoding solution, the coding tree node is decoded by using a multi-split mode-based hybrid coding split tree structure. In the decoding solution, more CU shapes than those in a quadtree split mode are allowed; fewer split levels than those in a binary tree split mode are used; simpler split mode information than that in a split mode of cascading a quadtree and a binary tree is used and more split modes than those in the split mode of cascading a quadtree and a binary tree are allowed; and higher compression efficiency than that in the split mode of cascading a quadtree and a binary tree can be achieved.

With reference to the first aspect, in a possible design, the split mode is used to determine at least one of a quantity of lower-level nodes included in the coding tree node, or sizes and distribution of the lower-level nodes.

The beneficial effects are as follows: The lower-level nodes included in the coding tree node are determined by using the split mode. In this way, more CU shapes are obtained through split.

With reference to the first aspect, in a possible design, the width of the coding tree node is four times of M pixels, and M is a positive integer; by using an upper left point of the coding tree node as an origin, a rightward direction is a horizontal positive direction, and a downward direction is a vertical positive direction; and the candidate split mode set further includes:

a fifth split mode for determining that the coding tree node includes the lower-level node for which (0, 0) is used as an upper left point, a width is two times of the M pixels, and a height is two times of the M pixels, the lower-level node for which (2M, 0) is used as an upper left point, a width is two times of the M pixels, and a height is two times of the M pixels, the lower-level node for which (0, 2M) is used as an upper left point, a width is two times of the M pixels, and a height is two times of the M pixels, and the lower-level node for which (2M, 2M) is used as an upper left point, a width is two times of the M pixels, and a height is two times of the M pixels; or a sixth split mode for determining that the coding tree node includes the lower-level node for which (0, 0) is used as an upper left point, a width is two times of the M pixels, and a height is two times of the M pixels, the lower-level node for which (2M, 0) is used as an upper left point, a width is two times of the M pixels, and a height is two times of the M pixels, and the lower-level node for which (0, 2M) is used as an upper left point, a width is four times of the M pixels, and a height is two times of the M pixels; or a seventh split mode for determining that the coding tree node includes the lower-level node for which (0, 0) is used as an upper left point, a width is four times of the M pixels, and a height is two times of the M pixels, the lower-level node for which (0, 2M) is used as an upper left point, a width is two times of the M pixels, and a height is two times of the M pixels, and the lower-level node for which (2M, 2M) is used as an upper left point, a width is two times of the M pixels, and a height is two times of the M pixels; or an eighth split mode for determining that the coding tree node includes the lower-level node for which (0, 0) is used as an upper left point, a width is two times of the M pixels, and a height is two times of the M pixels, the lower-level node for which (0, 2M) is used as an upper left point, a width is two times of the M pixels, and a height is two times of the M pixels, and the lower-level node for which (0, 2M) is used as an upper left point, a width is two times of the M pixels, and a height is four times of the M pixels; or a ninth split mode for determining that the coding tree node includes the lower-level node for which (0, 0) is used as an upper left point, a width is two times of the M pixels, and a height is four times of the M pixels, the lower-level node for which (2M, 0) is used as an upper left point, a width is two times of the M pixels, and a height is two times of the M pixels, and the lower-level node for which (2M, 2M) is used as an upper left point, a width is two times of the M pixels, and a height is two times of the M pixels; or a tenth split mode for determining that the coding tree node includes the lower-level node for which (0, 0) is used as an upper left point, a width is two times of the M pixels, and a height is two times of the M pixels, the lower-level node for which (2M, 0) is used as an upper left point, a width is two times of the M pixels, and a height is two times of the M pixels, the lower-level node for which (0, 2M) is used as an upper left point, a width is four times of the M pixels, and a height is the M pixels, and the lower-level node for which (0, 3M) is used as an upper left point, a width is four times of the M pixels, and a height is the M pixels; or an eleventh split mode for determining that the coding tree node includes the lower-level node for which (0, 0) is used as an upper left point, a width is four times of the M pixels, and a height is the M pixels, the lower-level node for which (0, M) is used as an upper left point, a width is four times of the M pixels, and a height is the M pixels, the lower-level node for which (0, 2M) is used as an upper left point, a width is two times of the M pixels, and a height is two times of the M pixels, and the lower-level node for which (2M, 2M) is used as an upper left point, a width is two times of the M pixels, and a height is two times of the M pixels; or a twelfth split mode for determining that the coding tree node includes the lower-level node for which (0, 0) is used as an upper left point, a width is two times of the M pixels, and a height is two times of the M pixels, the lower-level node for which (0, 2M) is used as an upper left point, a width is two times of the M pixels, and a height is two times of the M pixels, the lower-level node for which (2M, 0) is used as an upper left point, a width is the M pixels, and a height is four times of the M pixels, and the lower-level node for which (3M, 0) is used as an upper left point, a width is the M pixels, and a height is four times of the M pixels; or a thirteenth split mode for determining that the coding tree node includes the lower-level node for which (0, 0) is used as an upper left point, a width is the M pixels, and a height is four times of the M pixels, the lower-level node for which (M, 0) is used as an upper left point, a width is the M pixels, and a height is four times of the M pixels, the lower-level node for which (2M, 0) is used as an upper left point, a width is two times of the M pixels, and a height is two times of the M pixels, and the lower-level node for which (2M, 2M) is used as an upper left point, a width is two times of the M pixels, and a height is two times of the M pixels; or a fourteenth split mode for determining that the coding tree node includes the lower-level node for which (0, 0) is used as an upper left point, a width is four times of the M pixels, and a height is the M pixels, the lower-level node for which (0, M) is used as an upper left point, a width is four times of the M pixels, and a height is the M pixels, the lower-level node for which (0, 2M) is used as an upper left point, a width is four times of the M pixels, and a height is the M pixels, and the lower-level node for which (0, 3M) is used as an upper left point, a width is four times of the M pixels, and a height is the M pixels; or a fifteenth split mode for determining that the coding tree node includes the lower-level node for which (0, 0) is used as an upper left point, a width is the M pixels, and a height is four times of the M pixels, the lower-level node for which (0, M) is used as an upper left point, a width is the M pixels, and a height is four times of the M pixels, the lower-level node for which (0, 2M) is used as an upper left point, a width is the M pixels, and a height is four times of the M pixels, and the lower-level node for which (0, 3M) is used as an upper left point, a width is the M pixels, and a height is four times of the M pixels; or a sixteenth split mode for determining that the coding tree node includes the lower-level node for which (0, 0) is used as an upper left point, a width is four times of the M pixels, and a height is the M pixels, the lower-level node for which (0, M) is used as an upper left point, a width is four times of the M pixels, and a height is two times of the M pixels, and the lower-level node for which (0, 3M) is used as an upper left point, a width is four times of the M pixels, and a height is the M pixels; or a seventeenth split mode for determining that the coding tree node includes the lower-level node for which (0, 0) is used as an upper left point, a width is the M pixels, and a height is four times of the M pixels, the lower-level node for which (M, 0) is used as an upper left point, a width is two times of the M pixels, and a height is four times of the M pixels, and the lower-level node for which (3M, 0) is used as an upper left point, a width is the M pixels, and a height is four times of the M pixels.

The beneficial effects are as follows: Because the candidate split mode set may include the foregoing plurality of split modes, the coding tree node can be split in the foregoing plurality of split modes. Therefore, fewer split levels are used and more CU shapes are obtained through split.

With reference to the first aspect, in a possible design, that the split mode is used to determine lower-level nodes included in the coding tree node further includes:

the split mode is used to determine a decoding order of a plurality of lower-level nodes included in the coding tree node; and correspondingly, the fourth split mode includes a first submode of the fourth split mode in which four equal-sized lower-level nodes with an aspect ratio of 1 are decoded in a clockwise order, and a second submode of the fourth split mode in which four equal-sized lower-level nodes with an aspect ratio of 1 are decoded in a counterclockwise order, where the candidate split mode set includes at least the first submode of the fourth split mode.

The beneficial effects are as follows: The decoding order of the plurality of lower-level nodes is determined by using the split mode, so as to improve decoding efficiency.

With reference to the first aspect, in a possible design, the split mode information is indicated by a first syntax element, and the first syntax element is used to indicate an identifier of the obtained split mode in the candidate split mode set.

In this manner, the coding tree node needs to be split into lower-level nodes based on a split mode indicated by the first syntax element. Specifically, the coding tree node may not be split, or may be split into two, three, or four lower-level nodes.

With reference to the first aspect, in a possible design, the split mode information is indicated by a second syntax element and a third syntax element, the second syntax element is used to determine whether the obtained split mode is the first split mode, and when the second syntax element is used to determine that the obtained split mode is not the first split mode, the third syntax element is used to indicate an identifier of the obtained split mode in the candidate split mode set except the first split mode.

In this manner, the coding tree node needs to be split into lower-level nodes based on a split mode indicated by the third syntax element. Specifically, the coding tree node may be split into two, three, or four lower-level nodes.

With reference to the first aspect, in a possible design, the parsing the bitstream to obtain coding information of the coding tree node includes:

when the obtained split mode is not the first split mode, parsing the bitstream to obtain coding information of the lower-level node of the coding tree node, where when an aspect ratio of the lower-level node is 1 and a width of the lower-level node is greater than the preset threshold, the coding information of the lower-level node includes split mode information of the lower-level node; and correspondingly, the reconstructing a pixel value of the coding tree node based on the split mode information and the coding information of the coding tree node includes:

when the obtained split mode is not the first split mode, reconstructing a pixel value of the lower-level node based on the coding information of the lower-level node.

The beneficial effects are as follows: Because the coding tree node and the lower-level node of the coding tree node can be split in the plurality of split modes, fewer split levels are used and more CU shapes are obtained.

With reference to the first aspect, in a possible design, before the parsing split mode information of the coding tree node in a bitstream, the method further includes:

parsing indication information of the candidate split mode set in the bitstream, where the indication information is used to indicate a split mode included in the candidate split mode set.

The beneficial effects are as follows: The split mode included in the candidate split mode set is determined by using the indication information, so that a plurality of possible candidate split mode sets can be flexibly set, thereby achieving relatively high flexibility.

With reference to the first aspect, in a possible design, before the parsing split mode information of the coding tree node in a bitstream, the method further includes:

determine that the coding tree node is located within an image range of the video image.

According to a second aspect, a video image coding method is provided, including:

coding a coding tree node in a video image based on at least one split mode in a specified candidate split mode set of the coding tree node, to obtain a rate-distortion cost corresponding to each of the at least one split mode, where the rate-distortion cost is a sum of rate-distortion costs of all coding units obtained based on corresponding split modes, an aspect ratio of the coding tree node is 1 and a width of the coding tree node is greater than a preset threshold, the candidate split mode set includes a first split mode for indicating that the coding tree node is a basic coding unit of the video image, a second split mode for determining that the coding tree node includes two equal-sized lower-level nodes with an aspect ratio of 2, a third split mode for determining that the coding tree node includes two equal-sized lower-level nodes with an aspect ratio of 0.5, and a fourth split mode for determining that the coding tree node includes four equal-sized lower-level nodes with an aspect ratio of 1, and when an aspect ratio of the lower-level node is 1 and a width of the lower-level node is greater than the preset threshold, a candidate split mode set of the lower-level node is the same as the candidate split mode set of the coding tree node;

determining a split mode with a minimum rate-distortion cost as a target split mode of the coding tree node; and determining, based on the target split mode, each coding unit included in the coding tree node, and coding each coding unit to obtain a bitstream and a reconstruction image that are corresponding to the coding tree node.

In the foregoing coding solution, the coding tree node can be split based on the specified candidate split mode set. Therefore, fewer split levels are used and more CU shapes are obtained. In addition, the candidate split mode set may be further set. In this way, when a relatively large quantity of split modes are allowed in the candidate split mode set, a coder can try a relatively large quantity of split modes, and therefore compression performance is relatively good. When a relatively small quantity of split modes are allowed in the candidate split mode set, the coder can try a relatively small quantity of split modes, and therefor operation complexity is relatively low.

With reference to the second aspect, in a possible design, the determining, based on the target split mode, each coding unit included in the coding tree node includes:

determining, based on the target split mode of the coding tree node, N subnodes included in the coding tree node;

when the N subnodes include a square node and a width of an image area corresponding to the square node is greater than the preset threshold, performing coding based on the at least one split mode in the candidate split mode set, to obtain the rate-distortion cost corresponding to each of the at least one split mode;

determining the split mode with the minimum rate-distortion cost as a target split mode of the square node; and determining, based on the target split mode of the square node, a next-level square node included in the square node until there is no next-level square node or a width of an image area corresponding to the determined next-level square node is equal to the preset threshold, to obtain each coding unit included in the coding tree node.

The beneficial effects are as follows: The subnode of the coding tree node can be split based on the specified candidate split mode set. Therefore, fewer split levels are used and more CU shapes are obtained.

According to a third aspect, a video image decoding apparatus is provided, where a coding tree node is used to indicate a to-be-decoded rectangular image area in a video image, a lower-level node is used to indicate a part of the to-be-decoded rectangular image area, image areas indicated by different lower-level nodes do not overlap each other, and when the coding tree node is a coding unit of the video image, the coding tree node does not include the lower-level node; and the apparatus includes:

a parsing unit, configured to: parse split mode information of the coding tree node in a bitstream; obtain a split mode of the coding tree node from a candidate split mode set of the coding tree node based on the split mode information, where an aspect ratio of the coding tree node is 1 and a width of the coding tree node is greater than a preset threshold, the candidate split mode set includes a first split mode for indicating that the coding tree node is the coding unit of the video image, a second split mode for determining that the coding tree node includes two equal-sized lower-level nodes with an aspect ratio of 2, a third split mode for determining that the coding tree node includes two equal-sized lower-level nodes with an aspect ratio of 0.5, and a fourth split mode for determining that the coding tree node includes four equal-sized lower-level nodes with an aspect ratio of 1, and when an aspect ratio of the lower-level node is 1 and a width of the lower-level node is greater than the preset threshold, a candidate split mode set of the lower-level node is the same as the candidate split mode set of the coding tree node; and parse the bitstream to obtain coding information of the coding tree node; and a decoding unit, configured to reconstruct a pixel value of the coding tree node based on the split mode information and the coding information of the coding tree node.

With reference to the third aspect, in a possible design, the split mode is used to determine at least one of a quantity of lower-level nodes included in the coding tree node, or sizes and distribution of the lower-level nodes.

With reference to the third aspect, in a possible design, the width of the coding tree node is four times of M pixels, and M is a positive integer; by using an upper left point of the coding tree node as an origin, a rightward direction is a horizontal positive direction, and a downward direction is a vertical positive direction; and the candidate split mode set further includes:

a fifth split mode for determining that the coding tree node includes the lower-level node for which (0, 0) is used as an upper left point, a width is two times of the M pixels, and a height is two times of the M pixels, the lower-level node for which (2M, 0) is used as an upper left point, a width is two times of the M pixels, and a height is two times of the M pixels, the lower-level node for which (0, 2M) is used as an upper left point, a width is two times of the M pixels, and a height is two times of the M pixels, and the lower-level node for which (2M, 2M) is used as an upper left point, a width is two times of the M pixels, and a height is two times of the M pixels; or a sixth split mode for determining that the coding tree node includes the lower-level node for which (0, 0) is used as an upper left point, a width is two times of the M pixels, and a height is two times of the M pixels, the lower-level node for which (2M, 0) is used as an upper left point, a width is two times of the M pixels, and a height is two times of the M pixels, and the lower-level node for which (0, 2M) is used as an upper left point, a width is four times of the M pixels, and a height is two times of the M pixels; or a seventh split mode for determining that the coding tree node includes the lower-level node for which (0, 0) is used as an upper left point, a width is four times of the M pixels, and a height is two times of the M pixels, the lower-level node for which (0, 2M) is used as an upper left point, a width is two times of the M pixels, and a height is two times of the M pixels, and the lower-level node for which (2M, 2M) is used as an upper left point, a width is two times of the M pixels, and a height is two times of the M pixels; or an eighth split mode for determining that the coding tree node includes the lower-level node for which (0, 0) is used as an upper left point, a width is two times of the M pixels, and a height is two times of the M pixels, the lower-level node for which (0, 2M) is used as an upper left point, a width is two times of the M pixels, and a height is two times of the M pixels, and the lower-level node for which (0, 2M) is used as an upper left point, a width is two times of the M pixels, and a height is four times of the M pixels; or a ninth split mode for determining that the coding tree node includes the lower-level node for which (0, 0) is used as an upper left point, a width is two times of the M pixels, and a height is four times of the M pixels, the lower-level node for which (2M, 0) is used as an upper left point, a width is two times of the M pixels, and a height is two times of the M pixels, and the lower-level node for which (2M, 2M) is used as an upper left point, a width is two times of the M pixels, and a height is two times of the M pixels; or a tenth split mode for determining that the coding tree node includes the lower-level node for which (0, 0) is used as an upper left point, a width is two times of the M pixels, and a height is two times of the M pixels, the lower-level node for which (2M, 0) is used as an upper left point, a width is two times of the M pixels, and a height is two times of the M pixels, the lower-level node for which (0, 2M) is used as an upper left point, a width is four times of the M pixels, and a height is the M pixels, and the lower-level node for which (0, 3M) is used as an upper left point, a width is four times of the M pixels, and a is the M pixels; or an eleventh split mode for determining that the coding tree node includes the lower-level node for which (0, 0) is used as an upper left point, a width is four times of the M pixels, and a height is the M pixels, the lower-level node for which (0, M) is used as an upper left point, a width is four times of the M pixels, and a height is the M pixels, the lower-level node for which (0, 2M) is used as an upper left point, a width is two times of the M pixels, and a height is two times of the M pixels, and the lower-level node for which (2M, 2M) is used as an upper left point, a width is two times of the M pixels, and a height is two times of the M pixels; or a twelfth split mode for determining that the coding tree node includes the lower-level node for which (0, 0) is used as an upper left point, a width is two times of the M pixels, and a height is two times of the M pixels, the lower-level node for which (0, 2M) is used as an upper left point, a width is two times of the M pixels, and a height is two times of the M pixels, the lower-level node for which (2M, 0) is used as an upper left point, a width is the M pixels, and a height is four times of the M pixels, and the lower-level node for which (3M, 0) is used as an upper left point, a width is the M pixels, and a height is four times of the M pixels; or a thirteenth split mode for determining that the coding tree node includes the lower-level node for which (0, 0) is used as an upper left point, a width is the M pixels, and a height is four times of the M pixels, the lower-level node for which (M, 0) is used as an upper left point, a width is the M pixels, and a height is four times of the M pixels, the lower-level node for which (2M, 0) is used as an upper left point, a width is two times of the M pixels, and a height is two times of the M pixels, and the lower-level node for which (2M, 2M) is used as an upper left point, a width is two times of the M pixels, and a height is two times of the M pixels; or a fourteenth split mode for determining that the coding tree node includes the lower-level node for which (0, 0) is used as an upper left point, a width is four times of the M pixels, and a height is the M pixels, the lower-level node for which (0, M) is used as an upper left point, a width is four times of the M pixels, and a height is the M pixels, the lower-level node for which (0, 2M) is used as an upper left point, a width is four times of the M pixels, and a height is the M pixels, and the lower-level node for which (0, 3M) is used as an upper left point, a width is four times of the M pixels, and a height is the M pixels; or a fifteenth split mode for determining that the coding tree node includes the lower-level node for which (0, 0) is used as an upper left point, a width is the M pixels, and a height is four times of the M pixels, the lower-level node for which (0, M) is used as an upper left point, a width is the M pixels, and a height is four times of the M pixels, the lower-level node for which (0, 2M) is used as an upper left point, a width is the M pixels, and a height is four times of the M pixels, and the lower-level node for which (0, 3M) is used as an upper left point, a width is the M pixels, and a height is four times of the M pixels; or a sixteenth split mode for determining that the coding tree node includes the lower-level node for which (0, 0) is used as an upper left point, a width is four times of the M pixels, and a height is the M pixels, the lower-level node for which (0, M) is used as an upper left point, a width is four times of the M pixels, and a height is two times of the M pixels, and the lower-level node for which (0, 3M) is used as an upper left point, a width is four times of the M pixels, and a height is the M pixels; or a seventeenth split mode for determining that the coding tree node includes the lower-level node for which (0, 0) is used as an upper left point, a width is the M pixels, and a height is four times of the M pixels, the lower-level node for which (M, 0) is used as an upper left point, a width is two times of the M pixels, and a height is four times of the M pixels, and the lower-level node for which (3M, 0) is used as an upper left point, a width is the M pixels, and a height is four times of the M pixels.

With reference to the third aspect, in a possible design, that the split mode is used to determine lower-level nodes included in the coding tree node further includes:

the split mode is used to determine a decoding order of a plurality of lower-level nodes included in the coding tree node; and correspondingly, the fourth split mode includes a first submode of the fourth split mode in which four equal-sized lower-level nodes with an aspect ratio of 1 are decoded in a clockwise order, and a second submode of the fourth split mode in which four equal-sized lower-level nodes with an aspect ratio of 1 are decoded in a counterclockwise order, where the candidate split mode set includes at least the first submode of the fourth split mode.

With reference to the third aspect, in a possible design, the split mode information is indicated by a first syntax element, and the first syntax element is used to indicate an identifier of the obtained split mode in the candidate split mode set.

With reference to the third aspect, in a possible design, the split mode information is indicated by a second syntax element and a third syntax element, the second syntax element is used to determine whether the obtained split mode is the first split mode, and when the second syntax element is used to determine that the obtained split mode is not the first split mode, the third syntax element is used to indicate an identifier of the obtained split mode in the candidate split mode set except the first split mode.

With reference to the third aspect, in a possible design, when parsing the bitstream to obtain the coding information of the coding tree node, the parsing unit is specifically configured to:

when the obtained split mode is not the first split mode, parse the bitstream to obtain coding information of the lower-level node of the coding tree node, where when an aspect ratio of the lower-level node is 1 and a width of the lower-level node is greater than the preset threshold, the coding information of the lower-level node includes split mode information of the lower-level node; and correspondingly, when reconstructing the pixel value of the coding tree node based on the split mode information and the coding information of the coding tree node, the decoding unit is specifically configured to:

when the obtained split mode is not the first split mode, reconstruct a pixel value of the lower-level node based on the coding information of the lower-level node.

With reference to the third aspect, in a possible design, before parsing the split mode information of the coding tree node in the bitstream, the parsing unit is further configured to:

parse indication information of the candidate split mode set in the bitstream, where the indication information is used to indicate a split mode included in the candidate split mode set.

With reference to the third aspect, in a possible design, before parsing the split mode information of the coding tree node in the bitstream, the parsing unit is further configured to:

determine that the coding tree node is located within an image range of the video image.

According to a fourth aspect, a video image coding apparatus is provided, including:

a first coding unit, configured to code a coding tree node in a video image based on at least one split mode in a specified candidate split mode set of the coding tree node, to obtain a rate-distortion cost corresponding to each of the at least one split mode, where the rate-distortion cost is a sum of rate-distortion costs of all coding units obtained based on corresponding split modes, an aspect ratio of the coding tree node is 1 and a width of the coding tree node is greater than a preset threshold, the candidate split mode set includes a first split mode for indicating that the coding tree node is a basic coding unit of the video image, a second split mode for determining that the coding tree node includes two equal-sized lower-level nodes with an aspect ratio of 2, a third split mode for determining that the coding tree node includes two equal-sized lower-level nodes with an aspect ratio of 0.5, and a fourth split mode for determining that the coding tree node includes four equal-sized lower-level nodes with an aspect ratio of 1, and when an aspect ratio of the lower-level node is 1 and a width of the lower-level node is greater than the preset threshold, a candidate split mode set of the lower-level node is the same as the candidate split mode set of the coding tree node;

a determining unit, configured to: determine a split mode with a minimum rate-distortion cost as a target split mode of the coding tree node; and determine, based on the target split mode, each coding unit included in the coding tree node; and a second coding unit, configured to code each coding unit to obtain a bitstream and a reconstruction image that are corresponding to the coding tree node.

With reference to the fourth aspect, in a possible design, when determining, based on the target split mode, each coding unit included in the coding tree node, the determining unit is specifically configured to:

determine, based on the target split mode of the coding tree node, N subnodes included in the coding tree node;

when the N subnodes include a square node and a width of an image area corresponding to the square node is greater than the preset threshold, perform coding based on the at least one split mode in the candidate split mode set, to obtain the rate-distortion cost corresponding to each of the at least one split mode;

determine the split mode with the minimum rate-distortion cost as a target split mode of the square node; and determine, based on the target split mode of the square node, a next-level square node included in the square node until there is no next-level square node or a width of an image area corresponding to the determined next-level square node is equal to the preset threshold, to obtain each coding unit included in the coding tree node.

According to a fifth aspect, a decoding device is provided, where the device includes a processor and a memory, the memory stores a computer readable program, and the processor runs the program in the memory, to implement the decoding method in the first aspect.

According to a sixth aspect, a coding device is provided, where the device includes a processor and a memory, the memory stores a computer readable program, and the processor runs the program in the memory, to implement the coding method in the second aspect.

According to a seventh aspect, a computer storage medium is provided, where the computer storage medium is configured to store a computer software instruction for the first aspect or the second aspect, and the computer software instruction includes a program designed for performing the foregoing aspects.

It should be understood that the technical solutions of the third aspect to the seventh aspect of the embodiments of this application are consistent with those of the first aspect and the second aspect of the embodiments of this application, and the beneficial effects achieved by all the aspects and the corresponding implementable design manners are similar. Details are not described again.

DESCRIPTION OF EMBODIMENTS

Figure 1A:
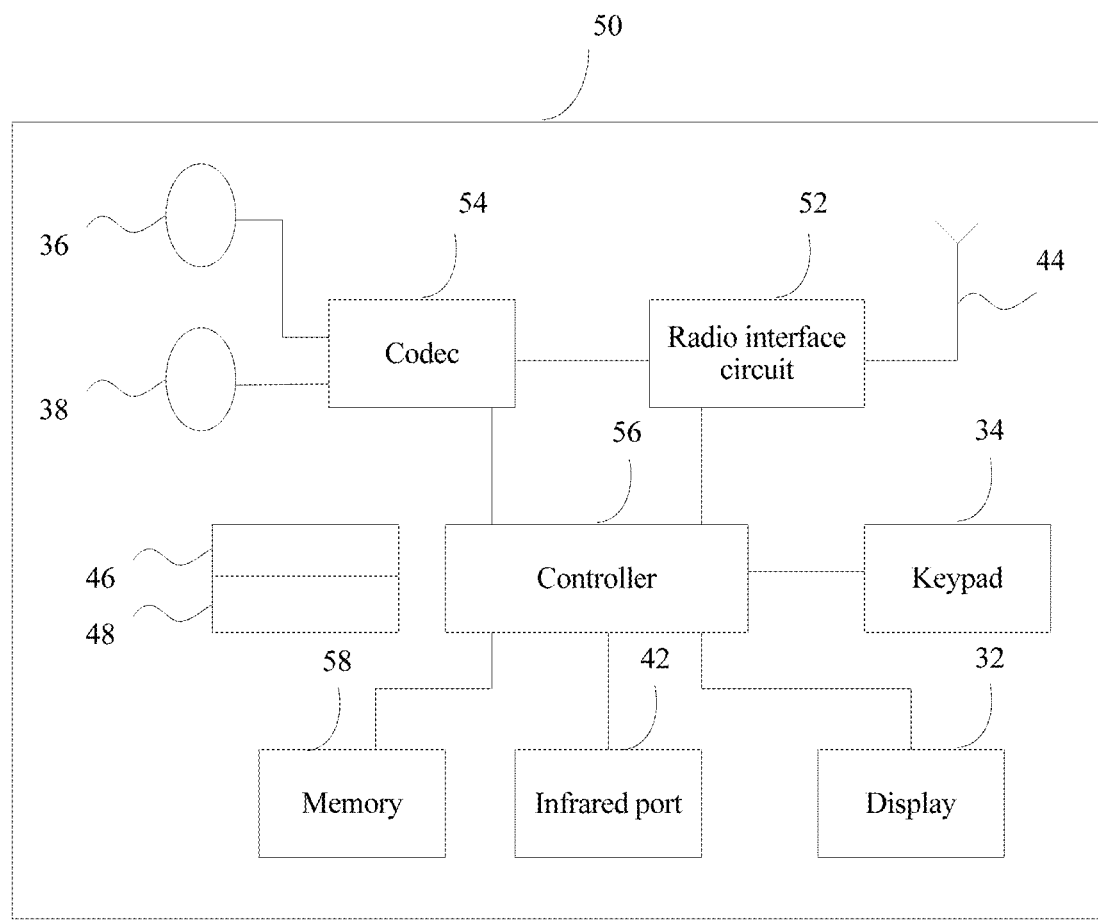
FIG. 1A and FIG. 1B are schematic block diagrams of a video coding and decoding apparatus or an electronic device.

The following clearly describes the technical solutions in the embodiments of this application with reference to the accompanying drawings in the embodiments of this application.

In the following, some terms in this application are described, so as to help a person skilled in the art have a better understanding.

CTU: One image includes a plurality of CTUs. One CTU is usually corresponding to one square image area, and includes a luminance pixel and a chrominance pixel in the image area (or may include only a luminance pixel or may include only a chrominance pixel). The CTU further includes a syntax element, and the syntax element indicates how the CTU is split into at least one CU and indicates a method for decoding each coding unit to obtain a reconstruction image.

CU: The CU is a most basic unit for coding, and cannot be further split. One CU is usually corresponding to one rectangular area of A×B, and includes A×B luminance pixels and chrominance pixels corresponding to the A×B luminance pixels. A is a width of the rectangle, B is a height of the rectangle, A and B may be the same or different, and values of A and B are usually 2 raised to the power of an integer, for example, 256, 128, 64, 32, 16, 8, or 4. Decoding processing may be performed on one CU to obtain a reconstruction image of the rectangular area of A×B through decoding processing, where the decoding processing usually includes processing such as prediction, dequantization, and inverse transformation. A prediction image and a residual are generated, and the prediction image and the residual are added to obtain the reconstructed image.

A size of the CTU is, for example, 64×64, 128×128, or 256×256. One CTU is split into a group of CUs that do not overlap each other, and the group of CUs cover the entire CTU. One group of CUs include one or more CUs. One CU includes luminance pixels of N rows and N columns, or includes chrominance pixels of N rows and N columns, or includes luminance pixels of N rows and N columns and chrominance pixels of N/2 rows and N/2 columns (for example, in a YUV420 format), or includes luminance pixels of N rows and N columns and chrominance pixels of N rows and N columns (for example, in a YUV444 format), or includes RGB pixels of N rows and N columns (for example, in an RGB format).

Quadtree: The quadtree is a tree structure, and one node can be split into four subnodes. In an H.265 video coding standard, a quadtree-based CTU split mode in which the CTU is used as a root node, and each node is corresponding to a square area is used. A node may not be split (in this case, an area corresponding to the node is a CU), or the node is split into four lower-level nodes, to be specific, the square area is split into four equal-sized square areas (a length and a width of each of the four equal-sized square areas are half of a length and a width of the square area before split), and each area is corresponding to a node.

Binary tree: The binary tree is a tree structure, and one node can be split into two subnodes. In an existing coding method in which a binary tree is used, a node on a binary tree structure may not be split, or the node is split into two lower-level nodes. The node is split into two nodes in two manners: (1) In a horizontal split manner, an area corresponding to the node is split into two equal-sized areas: an upper area and a lower area, and each area is corresponding to a node. (2) In a vertical split manner, an area corresponding to the node is split into two equal-sized areas: a left area and a right area, and each area is corresponding to a node.

Video decoding: The video decoding is a processing process of restoring a video bitstream to a reconstruction image according to a specific syntax rule and processing method.

Video coding: The video coding is a processing process of compressing an image sequence into a bitstream.

JEM: The JEM is new codec reference software developed by a JVET organization after an H.265 standard.

In addition, "a plurality of" in this application means two or more.

Figure 1B:
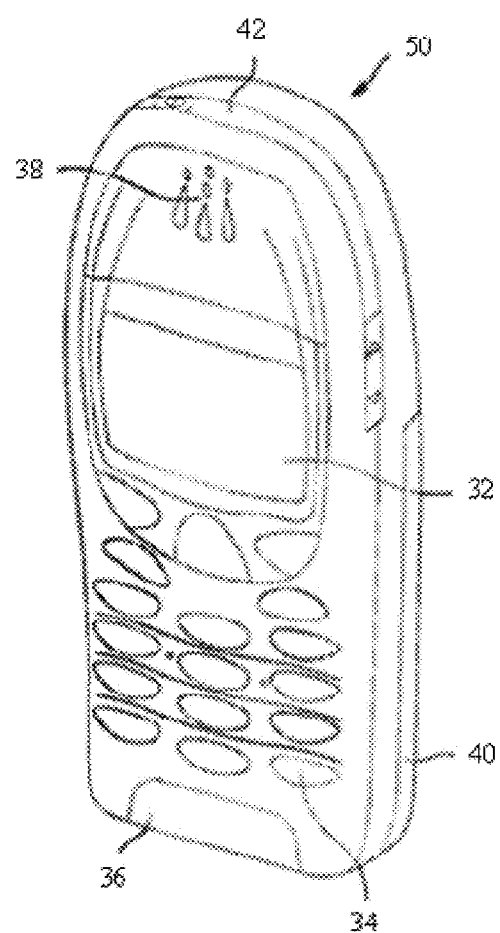

FIG. 1A is a schematic block diagram of a video coding and decoding apparatus or an electronic device 50. The apparatus or the electronic device may be incorporated into a codec in the embodiments of this application. FIG. 1B is a schematic diagram of a video coding apparatus according to an embodiment of this application. The following describes units in FIG. 1A and FIG. 1B.

The electronic device 50 may be, for example, a mobile terminal or user equipment in a wireless communications system. It should be understood that this embodiment of this application can be implemented on any electronic device or apparatus that may need to code and decode, or code, or decode a video image.

The apparatus 50 may include a housing for incorporating and protecting the apparatus. The apparatus 50 may further include a display 32 in a form of a liquid crystal display. In other embodiments of this application, the display may be any appropriate display suitable for displaying an image or a video. The apparatus 50 may further include a keypad 34. In other embodiments of this application, any appropriate data or user interface mechanism may be used. For example, a user interface may be implemented as a virtual keyboard or a data entry system may be implemented as a part of a touch-sensitive display. The apparatus may include a microphone 36 or any appropriate audio input, and the audio input may be a digital or analog signal input. The apparatus 50 may further include the following audio output device. The audio output device in this embodiment of this application may be any one of a headset 38, a loudspeaker, and an analog audio or digital audio output connection. The apparatus 50 may also include a battery 40. In other embodiments of this application, the apparatus may be powered by any appropriate mobile energy device such as a solar cell, a fuel cell, or a clockwork generator. The apparatus may further include an infrared port 42 used for short-range line-of-sight communication with another device. In other embodiments, the apparatus 50 may further include any appropriate short-range communication solution such as a Bluetooth wireless connection or a USB/live line wired connection.

The apparatus 50 may include a controller 56 or a processor that is configured to control the apparatus 50. The controller 56 may be connected to a memory 58. In this embodiment of this application, the memory may store image data or audio data, and/or store an instruction implemented on the controller 56. The controller 56 may be further connected to a codec circuit 54 suitable for implementing audio and/or video data coding and decoding, or for implementing auxiliary coding and decoding that are implemented by the controller 56.

The apparatus 50 may further include a card reader 48 and a smart card 46 that are configured to provide user information and are suitable for providing information used for network authentication and authorized user authentication.

The apparatus 50 may further include a radio interface circuit 52. The radio interface circuit is connected to the controller and is suitable for generating a wireless communication signal used for communication with a cellular communications network, a wireless communications system, or a wireless local area network, and the like. The apparatus 50 may further include an antenna 44. The antenna is connected to the radio interface circuit 52, and is configured to send, to another apparatus (or a plurality of apparatuses), a radio frequency signal generated in the radio interface circuit 52, and receive a radio frequency signal from the another apparatus (or the plurality of apparatuses).

In some embodiments of this application, the apparatus 50 includes a camera that can record or detect single frames, and the codec 54 or the controller receives and processes these single frames. In some embodiments of this application, the apparatus may receive to-be-processed video image data from another device before transmission and/or storage. In some embodiments of this application, the apparatus 50 may receive an image by using a wireless or wired connection, to code/decode the image.

Figure 2:
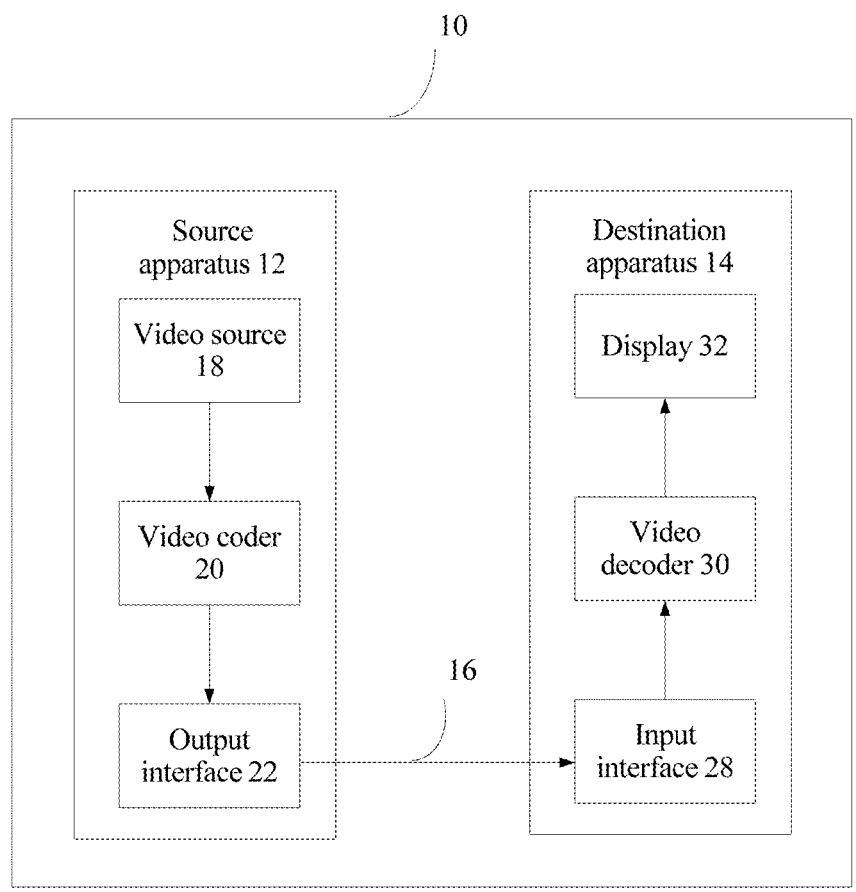
FIG. 2 is a schematic block diagram of a video coding and decoding system.

FIG. 2 is a schematic block diagram of a video coding and decoding system 10 according to an embodiment of this application. As shown in FIG. 2, the video coding and decoding system 10 includes a source apparatus 12 and a destination apparatus 14. The source apparatus 12 generates coded video data. Therefore, the source apparatus 12 may be referred to as a video coding apparatus or a video coding device. The destination apparatus 14 may decode the coded video data generated by the source apparatus 12. Therefore, the destination apparatus 14 may be referred to as a video decoding apparatus or a video decoding device. The source apparatus 12 and the destination apparatus 14 may be examples of a video coding/decoding apparatus or a video coding/decoding device. The source apparatus 12 and the destination apparatus 14 may include a wide range of apparatuses, including a desktop computer, a mobile computing apparatus, a notebook (for example, a laptop) computer, a tablet computer, a set top box, a handset such as a smartphone, a television, a camera, a display apparatus, a digital media player, a video game console, an in-vehicle computer, or the like.

The destination apparatus 14 may receive the coded video data from the source apparatus 12 through a channel 16. The channel 16 may include one or more media and/or apparatuses that can move the coded video data from the source apparatus 12 to the destination apparatus 14. In an example, the channel 16 may include one or more communications media that enable the source apparatus 12 to directly transmit the coded video data to the destination apparatus 14 in real time. In this example, the source apparatus 12 may modulate the coded video data according to a communications standard (for example, a wireless communications protocol), and may transmit modulated video data to the destination apparatus 14. The one or more communications media may include wireless and/or wired communications media such as a radio frequency (RF) spectrum or one or more physical transmission lines. The one or more communications media may constitute a part of a packet-based network (for example, a local area network, a wide area network, or a global network (for example, the internet)). The one or more communications media may include a router, a switch, a base station, or another device that facilitates communication between the source apparatus 12 and the destination apparatus 14.

In another example, the channel 16 may include a storage medium that stores the coded video data generated by the source apparatus 12. In this example, the destination apparatus 14 may access the storage medium through disk access or card access. The storage medium may include a plurality of locally accessible data storage media such as a Blu-ray, a DVD, a CD-ROM, a flash memory, or another appropriate digital storage medium configured to store the coded video data.

In another example, the channel 16 may include a file server or another intermediate storage apparatus that stores the coded video data generated by the source apparatus 12. In this example, the destination apparatus 14 may access, through streaming transmission or downloading, the coded video data stored in the file server or the another intermediate storage apparatus. The file server may be a server type that can store the coded video data and transmit the coded video data to the destination apparatus 14. In this example, the file server includes a web server (for example, used for a website), a file transfer protocol (FTP) server, a network attached storage (NAS) apparatus, and a local disk drive.

The destination apparatus 14 may access the coded video data by using a standard data connection (for example, an internet connection). An example type of the data connection includes a wireless channel (for example, a Wi-Fi connection) or a wired connection (for example, a DSL or a cable modem) that are suitable for accessing the coded video data stored in the file server, or a combination thereof. The coded video data may be transmitted from the file server through streaming transmission, downloading transmission, or a combination thereof.

The technology of this application is not limited to a wireless application scenario. For example, the technology may be applied to video coding and decoding in a plurality of multimedia applications that support the following applications: over-the-air television broadcast, cable television transmission, satellite television transmission, streaming video transmission (for example, by using the internet), coding of video data stored in a data storage medium, decoding of the video data stored in the data storage medium, or another application. In some examples, the video coding and decoding system 10 may be configured to support unidirectional or bidirectional video transmission, to support applications such as streaming video transmission, video play, video broadcast, and/or video calling.

In the example in FIG. 2, the source apparatus 12 includes a video source 18, a video coder 20, and an output interface 22. In some examples, the output interface 22 may include a modulator/demodulator (a modem) and/or a transmitter. The video source 18 may include a video capture apparatus (for example, a video camera), a video archive including previously captured video data, a video input interface configured to receive video data from a video content provider, and/or a computer graphics system configured to generate video data, or a combination of the foregoing video data sources.

The video coder 20 may code video data from the video source 18. In some examples, the source apparatus 12 directly transmits the coded video data to the destination apparatus 14 by using the output interface 22. The coded video data may be further stored in the storage medium or the file server, so that the destination apparatus 14 subsequently accesses the coded video data for decoding and/or play.

In the example in FIG. 2, the destination apparatus 14 includes an input interface 28, a video decoder 30, and a display 32. In some examples, the input interface 28 includes a receiver and/or a modem. The input interface 28 may receive the coded video data through the channel 16. The display 32 may be integrated with the destination apparatus 14, or may be outside the destination apparatus 14. The display 32 usually displays decoded video data. The display 32 may include a plurality of display apparatuses such as a liquid crystal display (LCD), a plasma display, an organic light-emitting diode (OLED) display, or a display apparatus of another type.

The video coder 20 and the video decoder 30 may perform operations according to a video compression standard (for example, the high efficiency video coding/decoding H.265 standard), and may conform to an HEVC test model (HM). The text description ITU-TH.265 (V3) (April 2015) of the H.265 standard is released on Apr. 29, 2015, may be downloaded from http://handle.itu.int/11.1002/1000/12455, and all content of the document is incorporated by reference in its entirety.

Alternatively, the video coder 20 and the video decoder 30 may perform operations according to other proprietary or industry standards. The standards include ITU-TH.261, ISO/IECMPEG-1Visual, ITU-TH.262 or ISO/IECMPEG-2Visual, ITU-TH.263, ISO/IECMPEG-4Visual, and ITU-TH.264 (also referred to as ISO/IEC MPEG-4 AVC), and the standard includes a scalable video coding/decoding (SVC) extension and a multiview video coding/decoding (MVC) extension. It should be understood that the technology of this application is not limited to any specific coding/decoding standard or technology.

In addition, FIG. 2 is merely an example, and the technology of this application may be applied to a video coding/decoding application (for example, single-side video coding or single-side video decoding) that not necessarily includes any data communication between a coding apparatus and a decoding apparatus. In another example, data is retrieved from a local memory, and the data is transmitted through streaming by using a network or the data is operated in a similar manner. The coding apparatus may code data and store the data in the memory, and/or the decoding apparatus may retrieve data from the memory and decode the data. In many examples, a plurality of apparatuses that do not communicate with each other and that only code data into the memory, and/or that only retrieve data from the memory and decode the data perform coding and decoding.

The video coder 20 and the video decoder 30 each may be implemented as any of a plurality of appropriate circuits, for example, one or more microprocessors, a digital signal processor (DSP), an application-specific circuit (ASIC), a field programmable gate array (FPGA), a discrete logic circuit, hardware, or any combination thereof. If the technology is partially or completely implemented by using software, the apparatus may store an instruction of the software in an appropriate non-transitory computer-readable storage medium, and one or more processors may be used to execute an instruction in hardware to execute the technology of this application. Any one of the foregoing items (including hardware, software, a combination of hardware and software, and the like) may be considered as one or more processors. The video coder 20 and the video decoder 30 each may be included in one or more coders or decoders, and each may be integrated as a part of a combined coder/decoder (codec (CODEC)) of another apparatus.

This application may generally indicate that specific information is "signaled" by the video coder 20 to another apparatus (for example, the video decoder 30). The term "signaled" may generally indicate a syntax element and/or represent transfer of coded video data. The transfer may occur in real time or approximately in real time. Alternatively, the communication may occur over a time span, for example, may occur when the syntax element is stored, during coding, in a computer-readable storage medium by using binary data obtained after coding. The decoding apparatus may retrieve the syntax element at any time after the syntax element is stored in the medium.

Figure 3:
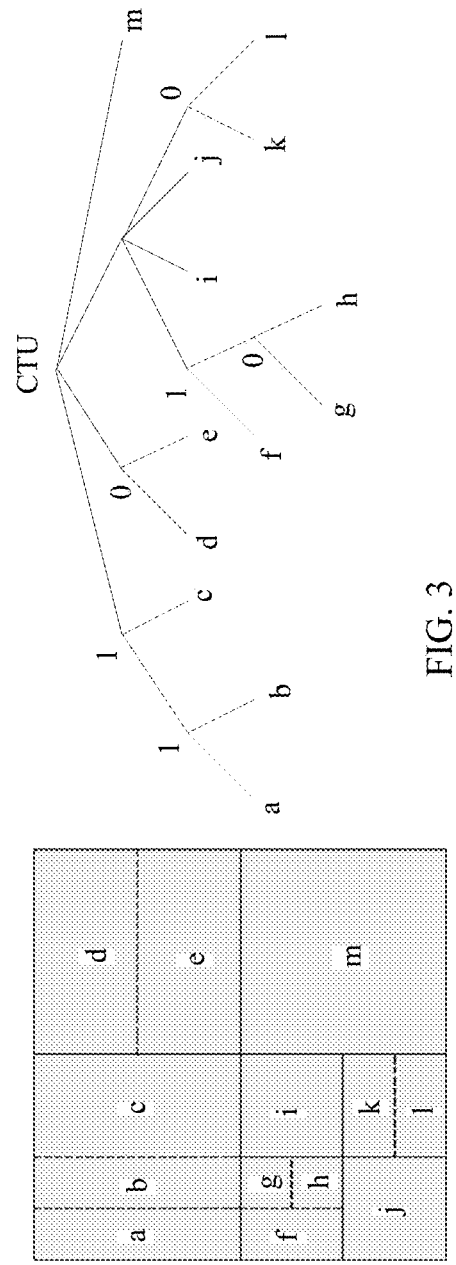
FIG. 3 is a schematic diagram of node split in a QTBT split mode.

In a QT structure in the H.265 standard, only square CUs of different sizes can be generated, and consequently the CU cannot be well adapted to textures of various shapes. In a QTBT structure in the JEM, a manner of cascading a QT and a BT manner is used, which is referred to as a QTBT split mode for short. For example, a CTU is first split in a QT manner, and a leaf node of a QT can still be split in a BT manner, which is shown in FIG. 3. In the right diagram of FIG. 3, each endpoint indicates one node. When four solid lines are connected to one node, it indicates quadtree split, and when two dashed lines are connected to one node, it indicates binary tree split, where a to m are 13 leaf nodes, and each leaf node is corresponding to one CU. On a binary tree node, 1 indicates vertical split, and 0 indicates horizontal split. As shown in the left figure in FIG. 3, one CTU is split into 13 CUs from a to m based on split in the right diagram. In the QTBT split mode, each CU has a QT depth (Quad-tree depth) and a BT depth (Binary tree depth), the QT depth indicates a QT depth of a QT leaf node of the CU, and the BT depth indicates a BT depth of a BT leaf node of the CU. For example, in FIG. 3, a QT depth and a BT depth of a and b are respectively 1 and 2; a QT depth and a BT depth of c, d, and e are both 1; a QT depth and a BT depth of f, k, and l are respectively 2 and 1; a QT depth and a BT depth of i and j are respectively 2 and 0; a QT depth and a BT depth of g and h are both 2; and a QT depth and a BT depth of m are respectively 1 and 0. If the CTU is split into only one CU, a QT depth of the CU is 0, and a BT depth of the CU is 0.

In the foregoing manner of cascading a QT and a BT, in addition to a square CU, a rectangular CU can be generated in the BT manner. However, one node is split into two nodes of a ½ size during one-time BT split, and if a node needs to be split into CUs of a smaller size, there are excessive split levels. In addition, in the manner of cascading a QT and a BT, to be specific, a leaf node of the QT is split in the BT manner, and a leaf node of the BT cannot be split in the QT manner.

In view of problems during video image coding and decoding, embodiments of this application provide a video image coding and decoding method and apparatus, so as to improve coding and decoding compression efficiency. The method and the apparatus are based on a same inventive concept. Because problem-resolving principles of the method and the apparatus are similar, apparatus implementation and method implementation may be mutually referenced. Repeated parts are not described.

Figure 4:
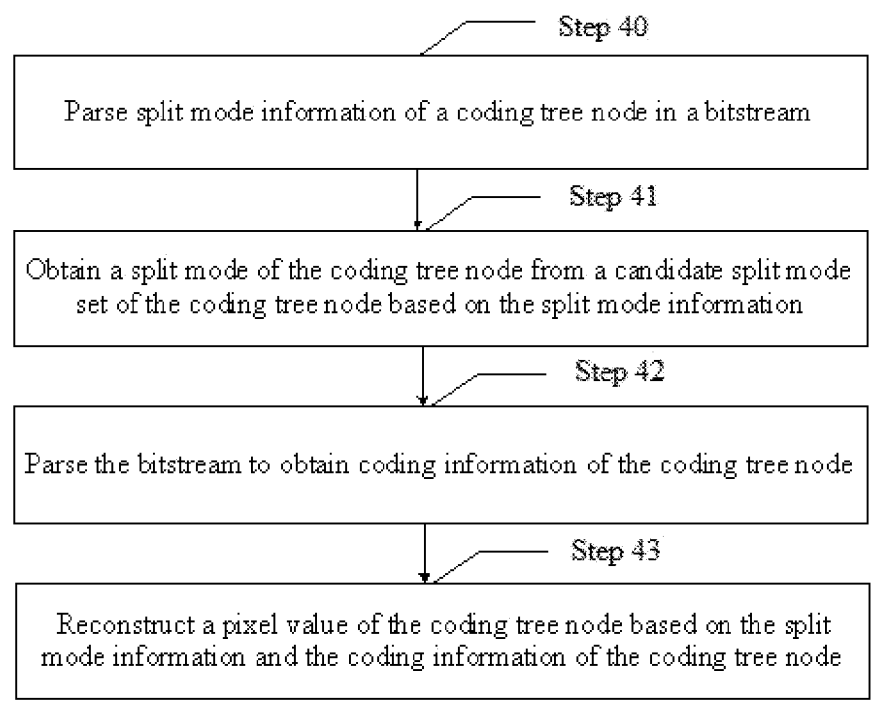
FIG. 4 is a flowchart of a video image decoding method according to an embodiment of this application.

FIG. 4 is a schematic flowchart of a video image decoding method according to an embodiment of this application. The procedure may be specifically implemented by using hardware, software programming, or a combination of software and hardware.

A decoder may be configured to perform the procedure shown in FIG. 4. A function module in the decoder that is configured to perform the video image decoding solution provided in this embodiment of this application may be specifically implemented by using hardware, software programming, and a combination of software and hardware. The hardware may include one or more signal processing processors and/or application-specific integrated circuits.

As shown in FIG. 4, the procedure specifically includes the following steps.

It should be noted that a coding tree node in this embodiment of this application is used to indicate a to-be-decoded rectangular image area in the video image, a lower-level node is used to indicate a part of the to-be-decoded rectangular image area, image areas indicated by different lower-level nodes do not overlap each other, and when the coding tree node is a coding unit of the video image, because the coding unit is a most basic unit for coding and cannot be further split, the coding tree node does not include the lower-level node.

Step 40: Parse split mode information of a coding tree node in a bitstream.

It should be noted that the split mode information of the coding tree node is used to indicate a split mode in a candidate split mode set of the coding tree node.

Optionally, before the parsing split mode information of the coding tree node in a bitstream, the method further includes:

parsing indication information of the candidate split mode set in the bitstream, where the indication information is used to indicate a split mode included in the candidate split mode set.

Further, before the parsing split mode information of the coding tree node in a bitstream, the following operation further needs to be performed: determining that the coding tree node is located within an image range of the video image.

Specifically, a syntax indication manner of the split mode information of the coding tree node includes the following two manners.

In a possible implementation, the split mode information is indicated by a first syntax element, and the first syntax element is used to indicate an identifier of the obtained split mode in the candidate split mode set.

In this manner, the coding tree node needs to be split into lower-level nodes based on a split mode indicated by the first syntax element. Specifically, the coding tree node may not be split, or may be split into two, three, or four lower-level nodes.

In another possible implementation, the split mode information is indicated by a second syntax element and a third syntax element, the second syntax element is used to determine whether the obtained split mode is the first split mode, and when the second syntax element is used to determine that the obtained split mode is not the first split mode, the third syntax element is used to indicate an identifier of the obtained split mode in the candidate split mode set except the first split mode.

In this manner, the coding tree node needs to be split into lower-level nodes based on a split mode indicated by the third syntax element. Specifically, the coding tree node may be split into two, three, or four lower-level nodes.

Step 41: Obtain a split mode of the coding tree node from a candidate split mode set of the coding tree node based on the split mode information, where the split mode is used to determine lower-level nodes included in the coding tree node, an aspect ratio of the coding tree node is 1 and a width of the coding tree node is greater than a preset threshold, the candidate split mode set includes a first split mode for indicating that the coding tree node is the coding unit of the video image, a second split mode for determining that the coding tree node includes two equal-sized lower-level nodes with an aspect ratio of 2, a third split mode for determining that the coding tree node includes two equal-sized lower-level nodes with an aspect ratio of 0.5, and a fourth split mode for determining that the coding tree node includes four equal-sized lower-level nodes with an aspect ratio of 1, and when an aspect ratio of the lower-level node is 1 and a width of the lower-level node is greater than the preset threshold, a candidate split mode set of the lower-level node is the same as the candidate split mode set of the coding tree node.

In another possible implementation, when the aspect ratio of the lower-level node is 1 and the width of the lower-level node is greater than the preset threshold, the candidate split mode set of the lower-level node may be the same as or different from the candidate split mode set of the coding tree node.

Figure 5:
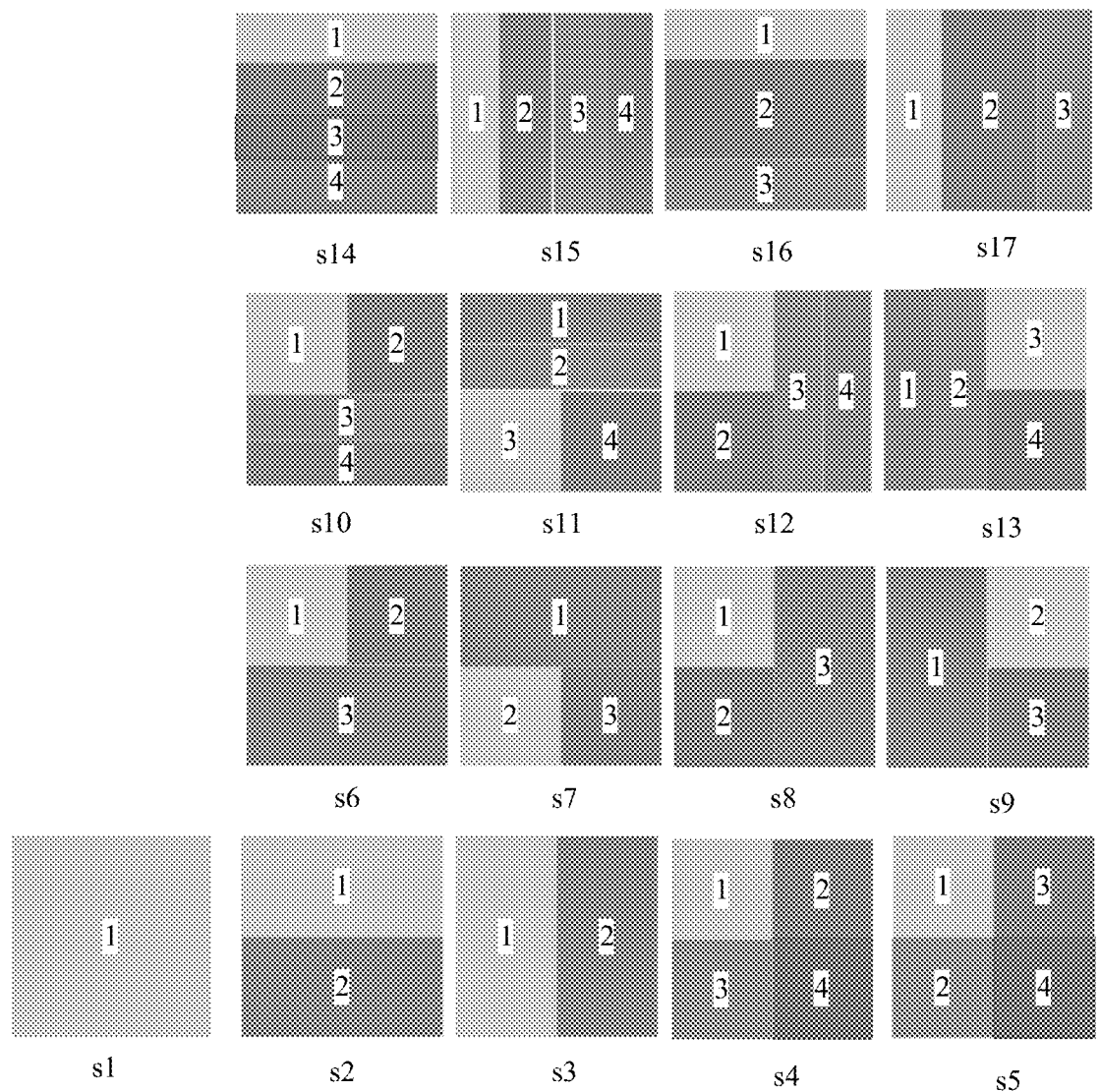
FIG. 5 is a schematic diagram of a split mode according to an embodiment of this application.

That the split mode is used to determine lower-level nodes included in the coding tree node includes: the split mode is used to determine at least one of a quantity of lower-level nodes included in the coding tree node, or sizes and distribution of the lower-level nodes. Optionally, the split mode is further used to determine a decoding order of a plurality of lower-level nodes included in the coding tree node. FIG. 5 is a schematic diagram of a split mode for a coding tree node. Reference signs 1, 2, 3, 4, and the like in FIG. 5 indicate a decoding sequence of a lower-level node.

The width of the coding tree node is four times of M pixels, and M is a positive integer; by using an upper left point of the coding tree node as an origin, a rightward direction is a horizontal positive direction, and a downward direction is a vertical positive direction; and the candidate split mode set includes:

the first split mode for determining that the coding tree node includes the lower-level node for which (0, 0) is used as an upper left point, a width is four times of the M pixels, and a height is four times of the M pixels, where for details, refer to S1 in FIG. 5;

the second split mode for determining that the coding tree node includes the lower-level node for which (0, 0) is used as an upper left point, a width is four times of the M pixels, and a height is two times of the M pixels, and the lower-level node for which (0, 2M) is used as an upper left point, a width is four times of the M pixels, and a height is two times of the M pixels, where for details, refer to S2 in FIG. 5;

the third split mode for determining that the coding tree node includes the lower-level node for which (0, 0) is used as an upper left point, a width is two times of the M pixels, and a height is four times of the M pixels, and the lower-level node for which (2M, 0) is used as an upper left point, a width is two times of the M pixels, and a height is four times of the M pixels, where for details, refer to S3 in FIG. 5;

the fourth split mode for determining that the coding tree node includes the lower-level node for which (0, 0) is used as an upper left point, a width is two times of the M pixels, and a height is two times of the M pixels, the lower-level node for which (0, 2M) is used as an upper left point, a width is two times of the M pixels, and a height is two times of the M pixels, the lower-level node for which (2M, 0) is used as an upper left point, a width is two times of the M pixels, and a height is two times of the M pixels, and the lower-level node for which (2M, 2M) is used as an upper left point, a width is two times of the M pixels, and a height is two times of the M pixels, where for details, refer to S4 in FIG. 5;

a fifth split mode for determining that the coding tree node includes the lower-level node for which (0, 0) is used as an upper left point, a width is two times of the M pixels, and a height is two times of the M pixels, the lower-level node for which (2M, 0) is used as an upper left point, a width is two times of the M pixels, and a height is two times of the M pixels, the lower-level node for which (0, 2M) is used as an upper left point, a width is two times of the M pixels, and a height is two times of the M pixels, and the lower-level node for which (2M, 2M) is used as an upper left point, a width is two times of the M pixels, and a height is two times of the M pixels, where for details, refer to S5 in FIG. 5;

a sixth split mode for determining that the coding tree node includes the lower-level node for which (0, 0) is used as an upper left point, a width is two times of the M pixels, and a height is two times of the M pixels, the lower-level node for which (2M, 0) is used as an upper left point, a width is two times of the M pixels, and a height is two times of the M pixels, and the lower-level node for which (0, 2M) is used as an upper left point, a width is four times of the M pixels, and a height is two times of the M pixels, where for details, refer to S6 in FIG. 5;

a seventh split mode for determining that the coding tree node includes the lower-level node for which (0, 0) is used as an upper left point, a width is four times of the M pixels, and a height is two times of the M pixels, the lower-level node for which (0, 2M) is used as an upper left point, a width is two times of the M pixels, and a height is two times of the M pixels, and the lower-level node for which (2M, 2M) is used as an upper left point, a width is two times of the M pixels, and a height is two times of the M pixels, where for details, refer to S7 in FIG. 5;

an eighth split mode for determining that the coding tree node includes the lower-level node for which (0, 0) is used as an upper left point, a width is two times of the M pixels, and a height is two times of the M pixels, the lower-level node for which (0, 2M) is used as an upper left point, a width is two times of the M pixels, and a height is two times of the M pixels, and the lower-level node for which (0, 2M) is used as an upper left point, a width is two times of the M pixels, and a height is four times of the M pixels, where for details, refer to S8 in FIG. 5;

a ninth split mode for determining that the coding tree node includes the lower-level node for which (0, 0) is used as an upper left point, a width is two times of the M pixels, and a height is four times of the M pixels, the lower-level node for which (2M, 0) is used as an upper left point, a width is two times of the M pixels, and a height is two times of the M pixels, and the lower-level node for which (2M, 2M) is used as an upper left point, a width is two times of the M pixels, and a height is two times of the M pixels, where for details, refer to S9 in FIG. 5;

a tenth split mode for determining that the coding tree node includes the lower-level node for which (0, 0) is used as an upper left point, a width is two times of the M pixels, and a height is two times of the M pixels, the lower-level node for which (2M, 0) is used as an upper left point, a width is two times of the M pixels, and a height is two times of the M pixels, the lower-level node for which (0, 2M) is used as an upper left point, a width is four times of the M pixels, and a height is the M pixels, and the lower-level node for which (0, 3M) is used as an upper left point, a width is four times of the M pixels, and a height is the M pixels, where for details, refer to S10 in FIG. 5;

an eleventh split mode for determining that the coding tree node includes the lower-level node for which (0, 0) is used as an upper left point, a width is four times of the M pixels, and a height is the M pixels, the lower-level node for which (0, M) is used as an upper left point, a width is four times of the M pixels, and a height is the M pixels, the lower-level node for which (0, 2M) is used as an upper left point, a width is two times of the M pixels, and a height is two times of the M pixels, and the lower-level node for which (2M, 2M) is used as an upper left point, a width is two times of the M pixels, and a height is two times of the M pixels, where for details, refer to S11 in FIG. 5;

a twelfth split mode for determining that the coding tree node includes the lower-level node for which (0, 0) is used as an upper left point, a width is two times of the M pixels, and a height is two times of the M pixels, the lower-level node for which (0, 2M) is used as an upper left point, a width is two times of the M pixels, and a height is two times of the M pixels, the lower-level node for which (2M, 0) is used as an upper left point, a width is the M pixels, and a height is four times of the M pixels, and the lower-level node for which (3M, 0) is used as an upper left point, a width is the M pixels, and a height is four times of the M pixels, where for details, refer to S12 in FIG. 5;

for determining that the coding tree node includes the lower-level node for which (0, 0) is used as an upper left point, a width is the M pixels, and a height is four times of the M pixels, the lower-level node for which (M, 0) is used as an upper left point, a width is the M pixels, and a height is four times of the M pixels, the lower-level node for which (2M, 0) is used as an upper left point, a width is two times of the M pixels, and a height is two times of the M pixels, and the lower-level node for which (2M, 2M) is used as an upper left point, a width is two times of the M pixels, and a height is two times of the M pixels, where for details, refer to S13 in FIG. 5;

a fourteenth split mode for determining that the coding tree node includes the lower-level node for which (0, 0) is used as an upper left point, a width is four times of the M pixels, and a height is the M pixels, the lower-level node for which (0, M) is used as an upper left point, a width is four times of the M pixels, and a height is the M pixels, the lower-level node for which (0, 2M) is used as an upper left point, a width is four times of the M pixels, and a height is the M pixels, and the lower-level node for which (0, 3M) is used as an upper left point, a width is four times of the M pixels, and a height is the M pixels, where for details, refer to S14 in FIG. 5;

a fifteenth split mode for determining that the coding tree node includes the lower-level node for which (0, 0) is used as an upper left point, a width is the M pixels, and a height is four times of the M pixels, the lower-level node for which (0, M) is used as an upper left point, a width is the M pixels, and a height is four times of the M pixels, the lower-level node for which (0, 2M) is used as an upper left point, a width is the M pixels, and a height is four times of the M pixels, and the lower-level node for which (0, 3M) is used as an upper left point, a width is the M pixels, and a height is four times of the M pixels, where for details, refer to S15 in FIG. 5;

a sixteenth split mode for determining that the coding tree node includes the lower-level node for which (0, 0) is used as an upper left point, a width is four times of the M pixels, and a height is the M pixels, the lower-level node for which (0, M) is used as an upper left point, a width is four times of the M pixels, and a height is two times of the M pixels, and the lower-level node for which (0, 3M) is used as an upper left point, a width is four times of the M pixels, and a height is the M pixels, where for details, refer to S16 in FIG. 5; and a seventeenth split mode for determining that the coding tree node includes the lower-level node for which (0, 0) is used as an upper left point, a width is the M pixels, and a height is four times of the M pixels, the lower-level node for which (M, 0) is used as an upper left point, a width is two times of the M pixels, and a height is four times of the M pixels, and the lower-level node for which (3M, 0) is used as an upper left point, a width is the M pixels, and a height is four times of the M pixels, where for details, refer to S17 in FIG. 5.

The candidate split mode set includes the first split mode, the second split mode, the third split mode, and the fourth split mode. Optionally, the candidate split mode set further includes at least one of the fifth split mode, the sixth split mode, the seventh split mode, the eighth split mode, the ninth split mode, the tenth split mode, the eleventh split mode, the twelfth split mode, the thirteenth split mode, the fourteenth split mode, the fifteenth split mode, the sixteenth split mode, or the seventeenth split mode.

Based on characteristics of the foregoing split modes, optionally, the foregoing split modes may be specifically classified into the following six types:

Type 1: A node is split into two rectangular subnodes with a length-width ratio of 2, and two split modes: the second split mode and the third split mode are specifically included.

Type 2: A node is split into four square subnodes, and two split modes: the fourth split mode and the fifth split mode are specifically included.

Type 3: A node is split into two square subnodes and one rectangular subnode with a length-width ratio of 2, and four split modes: the sixth split mode, the seventh split mode, the eighth split mode, and the ninth split mode are specifically included.

Type 4: A node is split into two square subnodes and two rectangular subnodes with a length-width ratio of 4, and four split modes: the tenth split mode, the eleventh split mode, the twelfth split mode, and the thirteenth split mode are specifically included.

Type 5: A node is split into four rectangular subnodes with a length-width ratio of 4, and two split modes: the fourteenth split mode and the fifteenth split mode are specifically included.

Type 6: A node is split into one rectangular subnode with a length-width ratio of 2 and two rectangular subnodes with a length-width ratio of 4, and two split modes: the sixteenth split mode and the seventeenth split mode are specifically included.

If the coding tree node continues to be split, a group of split modes allowed to be used for the coding tree node includes at least s2 to s4, and may further include at least one of combinations of five groups of split modes: s5, s6 to s9, s10 to s13, s14 and s15, or s16 and s17. An optional combination of the candidate split mode set may specifically include the following 12 different combinations:

Combination 1: s2 to s4.
Combination 2: s2 to s4 and s6 to s9.
Combination 3: s2 to s4, s6 to s9, and s16 and s17.
Combination 4: s2 to s4, s5, s6 to s9, and s16 and s17.
Combination 5: s2 to s4, s6 to s9, s14 and s15, and s16 and s17.
Combination 6: s2 to s4, s5, s6 to s9, s14 and s15, and s16 and s17.
Combination 7: s2 to s4, s6 to s9, s10 to s13, and s14 and s15.

Combination 8: s2 to s4, s6 to s9, s10 to s13, s14 and s15, and s16 and s17.

Combination 9: s2 to s4, s5, s6 to s9, s10 to s13, s14 and s15, and s16 and s17.

Combination 10: s2 to s4, s5, and s6 to s9.

Combination 11: s2 to s4, s5, s6 to s9, s10 to s13, and s16 and s17.

Combination 12: s2 to s4, s6 to s9, s10 to s13, and s16 and s17.

Step 42: Parse the bitstream to obtain coding information of the coding tree node.

Step 43: Reconstruct a pixel value of the coding tree node based on the split mode information and the coding information of the coding tree node.

Specifically, the parsing the bitstream to obtain coding information of the coding tree node includes the following two possible implementations:

In a possible implementation, when the obtained split mode is not the first split mode, the bitstream is parsed to obtain coding information of the lower-level node of the coding tree node, where when an aspect ratio of the lower-level node is 1 and a width of the lower-level node is greater than the preset threshold, the coding information of the lower-level node includes split mode information of the lower-level node; and correspondingly, the reconstructing a pixel value of the coding tree node based on the split mode information and the coding information of the coding tree node includes:

when the obtained split mode is not the first split mode, reconstructing a pixel value of the lower-level node based on the coding information of the lower-level node.

In another possible implementation, when the obtained split mode is the first split mode, the bitstream is parsed to obtain the coding information of the coding tree node, where when the aspect ratio of the coding tree node is 1 and the width of the coding tree node is equal to the preset threshold, or when the aspect ratio of the coding tree node is not 1, the coding information of the coding tree node does not include the split mode information of the coding tree node; and correspondingly, the reconstructing a pixel value of the coding tree node based on the split mode information and the coding information of the coding tree node includes:

when the obtained split mode is the first split mode, reconstructing the pixel value of the coding tree node based on the coding information of the coding tree node.

According to the foregoing method, the coding tree node can be split into a plurality of CUs. Further, a pixel value of each CU is reconstructed based on coding information of each CU, to reconstruct the pixel value of the coding tree node.

Specifically, CU decoding includes processing such as entropy decoding, dequantization, inverse transformation, prediction, and loop filtering. A process of the CU decoding mainly includes:

1. obtaining the coding information such as a prediction mode, a quantization parameter, a transformation coefficient, and a transformation mode of the CU through the entropy decoding;

2. selecting intra-frame prediction or inter-frame prediction based on the prediction mode, to obtain a prediction pixel of the CU;

3. if the CU includes the transformation coefficient, performing dequantization and inverse transformation on the transformation coefficient based on the quantization parameter and the transformation mode, to obtain a reconstruction residual of the CU; or if the CU does not include the transformation coefficient, a reconstruction residual of the CU is 0, in other words, a reconstruction residual value of each pixel in the CU is 0; and 4. performing loop filtering after the prediction pixel and the reconstruction residual are added, to obtain a reconstruction pixel value of the CU.

Figure 6:
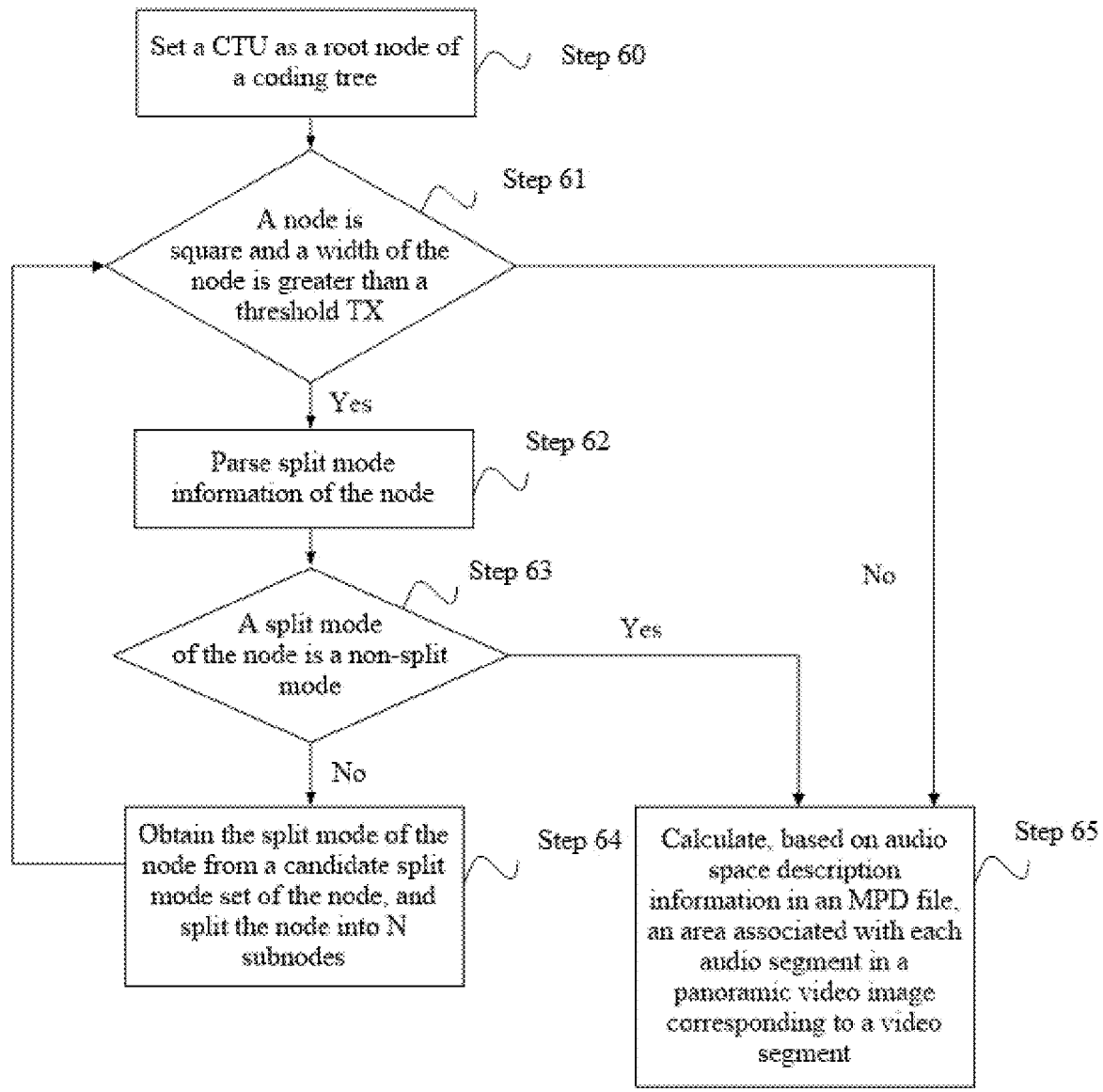
FIG. 6 is a schematic diagram of a decoding process for at least one CTU in a video image.

FIG. 6 is a schematic diagram of a decoding process for at least one CTU in a video image. Specific steps are as follows:

Step 60: Set a CTU as a root node of a coding tree, and then perform step 61.

In this case, a coding tree depth of the CTU is set to 0.

Step 61: If a node is square and a width of the node is greater than a threshold TX, perform step 62, or otherwise perform step 65.

Step 62: Parse split mode information of the node, and then perform step 63.

Step 63: If a split mode of the node is a non-split mode, namely, the foregoing first split mode, perform step 64, or otherwise perform step 65.

If a node is a non-square node or a square node and a width is equal to the threshold TX, it is determined that the node does not need to be split, and a corresponding split mode is the non-split mode. In this case, the node is correspondingly one CU.

When the node is square, to be specific, a width of an image area corresponding to the node is equal to a height, the threshold TX may be set to be equal to a minimum CU side length, and may be obtained by parsing an SPS in a bitstream. A value of the threshold TX is, for example, 4, 8, or 16.

Step 64: Obtain the split mode of the node from a candidate split mode set of the node, and split the node into N subnodes, where N is equal to 2, 3, or 4. For each subnode, step 61 is performed in a node processing order indicated by the split mode information, to further determine split of each subnode.

A coding tree depth of the subnode is obtained by adding a coding tree depth of a parent node of the subnode by 1.

More specifically, a syntax indication manner and a parsing manner of the split mode information of the coding tree node may be one of the following two manners.

Manner 1: An indicator (flag) is first parsed, and for example, the indicator is referred to as split_flag. If split_flag is 0, it indicates that the node is not split and is determined as a leaf node. If split_flag is 1, it indicates that the node needs to be split. Then, a split mode sequence number is parsed, and for example, the split mode sequence number is referred to as split_mode_idx, to obtain a split mode of the node. For example, if a split mode combination of the node is the foregoing combination 3 (in other words, includes nine split modes such as s2 to s4, s6 to s9, and s16 and s17), a one-to-one mapping relationship between split_mode_idx and a split mode is established, which is, for example, shown in Table 1 or Table 2.

TABLE 1

| | split_mode_idx | | | | | | | | |
|---|---|---|---|---|---|---|---|---|---|
| | 0 | 1 | 2 | 3 | 4 | 5 | 6 | 7 | 8 |
| Split mode | s2 | s3 | s4 | s6 | s7 | s8 | s9 | s16 | s17 |

TABLE 2

| split_mode_idx | 0 | 1 | 2 | 3 | 4 | 5 | 6 | 7 | 8 |
|---|---|---|---|---|---|---|---|---|---|
| Split mode | s4 | s3 | s2 | s8 | s9 | s6 | s7 | s17 | s16 |

Manner 2: A syntax element split_mode is parsed, and a value of split_mode is an integer greater than or equal to 0. If split_mode is equal to 0, it indicates that the node does not need to be split. If split_mode is greater than 0, a corresponding split mode is obtained by using split_mode. A context-adaptive binary arithmetic coding (CABAC) binarization method of split_mode is shown in Table 3, and a syntax element value of split_mode and a corresponding split mode may be obtained by searching Table 3 based on a parsed bin string. In this example, a split mode combination of the node is the foregoing combination 12, in other words, includes 14 split modes: s2 to s4, s6 to s13, and s16 and s17.

TABLE 3

| split_mode | Split mode | Bin string |
|---|---|---|
| 0 | S1 (not split) | 1 |
| 1 | s4 | 01 |
| 2 | s2 | 0011 |
| 3 | s3 | 0001 |
| 4 | s16 | 00101 |
| 5 | s17 | 00001 |
| 6 | s6 | 0010010 |
| 7 | s7 | 0010000 |
| 8 | s10 | 0010011 |
| 9 | s11 | 0010001 |
| 10 | s8 | 0000010 |
| 11 | s9 | 0000000 |
| 12 | s12 | 0000011 |
| 13 | s13 | 0000001 |

Step 65: The node is corresponding to one CU, and coding information of the CU is parsed.

In the related art, the coding information of the CU is included in a syntax structure, for example, a syntax structure of coding_unit( ) in H.265. The coding information of the CU includes, for example, a prediction mode and a transformation coefficient.

Steps 61 to 63 are recursively performed, and the CTU (the root node) may be determined as a group of leaf nodes, and the coding information of the CU corresponding to the leaf node is obtained through parsing.

It should be noted that one candidate split mode set may be used for a slice segment, a slice, an image, or a sequence, and the candidate split mode set may be predefined or marked in the bitstream. For example, a candidate split mode set of an I frame is predefined as the combination 9, and a candidate split mode set of a non-I frame is predefined as the combination 8. For another example, a candidate split mode set of all types of frames is predefined as the combination 7. For another example, a candidate split mode set that can be used for a corresponding slice or slice segment is marked in a slice header or a slice segment header. Alternatively, a candidate split mode set that can be used for each of the I frame, a P frame, and a B frame in the sequence is indicated in a sequence parameter set (SPS).

In an optional manner, the combination 12 is used for all CTUs.

In another optional manner, the candidate split mode set needs to include s2 to s4. In addition, the SPS includes an N-bit syntax element A, and each bit indicates whether the candidate split mode set includes some split modes in s5 to s16. For example, the syntax element A includes four bits. A first bit indicates whether the candidate split mode set further includes s6 to s9, a second bit indicates whether the candidate split mode set further includes s16 and s17, a third bit indicates whether the candidate split mode set further includes s10 to s13, and a fourth bit indicates whether the candidate split mode set further includes s5, s14, and s15. For another example, the syntax element A includes three bits. A first bit indicates whether the candidate split mode set further includes s6 to s9, a second bit indicates whether the candidate split mode set further includes s10 to s13, and a third bit indicates whether the candidate split mode set further includes s14 and s15. A specific composition manner of the candidate split mode set may be obtained by parsing the syntax element A in the SPS. Advantages of this manner are as follows: A coder limited by computation complexity tries only some split modes during a rate-distortion optimization decision making. In this case, the syntax element A may be correspondingly set, so that a decoder learns of an actually used candidate split mode set, thereby reducing bit overheads of the split mode information.

A syntax table of a syntax structure used for the split mode information in Embodiment 1 is shown in Table 4. In Table 4, coding_tree( ) is a coding tree syntax structure, and describes a specific split mode in which a coding tree node is split based on a multi-split mode-based split tree, where x0 indicates an upper left horizontal offset of the node (in other words, an upper left area corresponding to the node) relative to that of the CTU (an upper left area corresponding to the CTU), and x1 indicates an upper left vertical offset of the node relative to that of the CTU (one pixel is used as a unit); cuWidth and cuHeight respectively indicate a width and a height of the node (one pixel is used as a unit); minCUSize indicates a minimum CU side length (for example, 4); " . . . " indicates an omitted syntax element, syntax structure, variable, or calculation processing; ae(v) indicates CABAC-based decoding; and condA indicates "whether an area corresponding to the node is inside an image" (if yes, condA is true, or otherwise, condA is false), where for example, condA may be x0+cuWidth-≤picWidth&&x1+cuHeight≤picHeight, where picWidth and picHeight indicate a width and a height of the image (one pixel is used as a unit).

A large quantity of CTUs in the image entirely fall inside the image. Therefore, nodes inside the CTUs are also inside the image, and condA of the node is always true (to be specific, for these CTUs, there is no need to determine condA when split_flag is parsed). For a small quantity of CTUs, some of the CTUs fall inside the image and the others fall outside the image. Therefore, condA of a coding tree node inside the CTU may be false. When one part of the area corresponding to the node is inside the image and the other part is outside the image, condA is false, the node is split in an s4 manner by default, and an indicator and a split mode sequence number do not need to be transmitted.

A split mode of one coding tree node may be obtained by parsing a coding tree split syntax structure coding_tree( ) of the coding tree node. Details are as follows:

If the node is inside the image, the width of the node is equal to the height, and a side length of the node is greater than the preset minimum CU side length, the indicator split_flag is obtained from the bitstream through parsing, or otherwise the flag bit split_flag does not appear in the bitstream. In this case, if the width of the node is greater than the minimum CU side length, a value of split_flag is 1 by default, and a node split mode is s4 by default, or otherwise a value of split_flag is 0 by default, and the node is not split by default.

If split_flag of the node is equal to 0, the node is not split, the node is corresponding to one CU, and CU coding information coding unit( ) is parsed, or otherwise (split_flag is equal to 1) the node continues to be split. In this case, a syntax element split_mode_idx indicating a split mode is obtained from the bitstream through parsing, and the node is split based on the split mode indicated by split_mode_idx. For example, if the split mode combination is the foregoing combination 2 (in other words, optional split modes are s1 to s4 and s6 to s9), when split_mode_idx is equal to 0 to 6, it indicates that the node split mode is s2, s3, s4, s6, s7, s8, and s9 respectively. For another example, if the split mode combination is the foregoing combination 3 (in other words, optional split modes are s1 to s4, s6 to s9, and s16 and s17), when split_mode_idx is equal to 0 to 8, it indicates that the node split mode is s2, s3, s4, s6, s7, s8, s9, s16, and s17 respectively.

If the node continues to be split (in other words, split_flag [x0][y0] is not 0), the following processing is performed.

First, a quantity of nodes numNodeSplit generated in the split mode of the node is obtained based on split_mode_idx, where getNumNodeSplit( ) indicates corresponding processing; for example, a quantity of nodes generated in a corresponding split mode is obtained through table lookup based on split_mode_idx.

Then, for each node generated after the split, a location (indicated by x1 and y1) and a shape (indicated by cuWidth1 and cuHeight1) of the node are successively calculated based on a location (indicated by x0 and y0), a shape (indicated by cuWidth and cuHieght), and a split mode (indicated by split_mode_idx[x0][y0]) of a parent node of the node, where getNodeInfo( ) indicates corresponding processing, and the coding tree information continues to be parsed for each of these nodes generated after the split.

If split of the node is stopped (in other words, split_flag [x0][y0] is equal to 0), the CU coding information of the node is parsed (for example, information such as the prediction mode and a residual of the CU is parsed). In Table 4, coding_unit( ) indicates a syntax structure of the CU coding information.

TABLE 4

|  | Descriptor |
|---|---|
| coding_tree(x0, y0, cuWidth, cuHeight, ... ) { | |
| ... | |
| if(condA && cuWidth == cuHeight && cuWidth > minCUSize) { | |
| split_flag[x0][y0] | ae(v) |
| if(split_flag[x0][y0]) | |
| split_mode_idx[x0][y0] | ae(v) |
| } | |
| ... | |
| if( split_flag[x0][y0]) { | |
| numNodeSplit = getNumNodeSplit(split_mode_idx[x0][y0]) | |
| for(i=0; i< numNodeSplit; i++) { | |
| getNodeInfo(x1, y1, cuWidth1, cuHeight1, x0, y0, cuWidth, cuHeight, i, split_mode_idx[x0][y0]) | |
| coding_tree(x1,y1, cuWidth1, cuHeight1, ... ) | |
| } | |
| } else { | |
| coding_unit(x0, y0, cuWidth, cuHeight, ... ) | |
| } | |
| } | |

Figure 7:
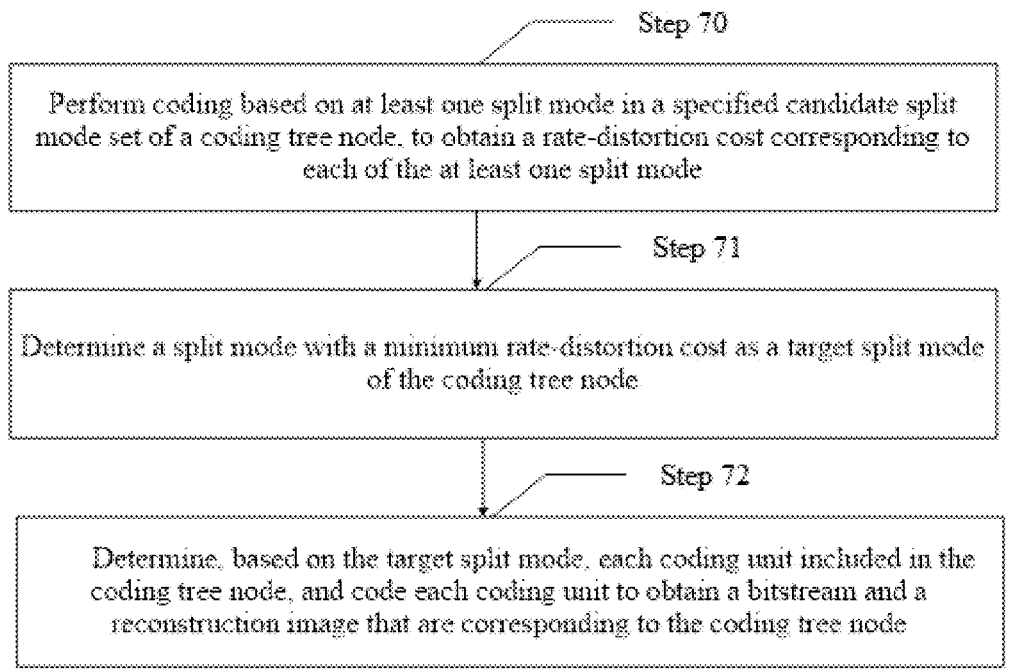
FIG. 7 is a flowchart of a video image coding method according to an embodiment of this application.

FIG. 7 is a schematic flowchart of a video image coding method according to an embodiment of this application. The procedure may be specifically implemented by using hardware, software programming, or a combination of software and hardware.

A coder may be configured to perform the procedure shown in FIG. 7. A function module in the coder that is configured to perform the video image coding solution provided in this embodiment of this application may be specifically implemented by using hardware, software programming, and a combination of software and hardware. The hardware may include one or more signal processing processor and/or application-specific integrated circuits.

As shown in FIG. 7, the procedure specifically includes the following steps.

Step 70: Perform coding based on at least one split mode in a specified candidate split mode set of a coding tree node, to obtain a rate-distortion cost corresponding to each of the at least one split mode.

The rate-distortion cost is a sum of rate-distortion costs of all coding units obtained based on corresponding split modes, an aspect ratio of the coding tree node is 1 and a width of the coding tree node is greater than a preset threshold, the candidate split mode set includes a first split mode for indicating that the coding tree node is a basic coding unit of a video image, a second split mode for determining that the coding tree node includes two equal-sized lower-level nodes with an aspect ratio of 2, a third split mode for determining that the coding tree node includes two equal-sized lower-level nodes with an aspect ratio of 0.5, and a fourth split mode for determining that the coding tree node includes four equal-sized lower-level nodes with an aspect ratio of 1, and when an aspect ratio of the lower-level node is 1 and a width of the lower-level node is greater than the preset threshold, a candidate split mode set of the lower-level node is the same as the candidate split mode set of the coding tree node.

In another possible implementation, the candidate split mode set of the lower-level node may be the same as or different from the candidate split mode set of the coding tree node.

Step 71: Determine a split mode with a minimum rate-distortion cost as a target split mode of the coding tree node.

Step 72: Determine, based on the target split mode, each coding unit included in the coding tree node, and code each coding unit to obtain a bitstream and a reconstruction image that are corresponding to the coding tree node.

Specifically, the determining, based on the target split mode, each coding unit included in the coding tree node includes:

determining, based on the target split mode of the coding tree node, N subnodes included in the coding tree node;

when the N subnodes include a square node and a width of an image area corresponding to the square node is greater than the preset threshold, performing coding based on the at least one split mode in the candidate split mode set, to obtain the rate-distortion cost corresponding to each of the at least one split mode;

determining the split mode with the minimum rate-distortion cost as a target split mode of the square node; and determining, based on the target split mode of the square node, a next-level square node included in the square node until there is no next-level square node or a width of an image area corresponding to the determined next-level square node is equal to the preset threshold, to obtain each coding unit included in the coding tree node.

A manner in which the coding tree node is split into CUs may be indicated by a combination of syntax elements of split_flag and split_mode_idx. As shown in Table 4, if a target split mode of the CU is a non-split mode, split_flag is equal to 0, or otherwise split_flag is equal to 1, and a value of split_mode_idx is corresponding to the target split mode.

CU coding includes processing such as prediction, transformation, quantization, and entropy coding. Main processing of the CU coding includes the following steps:

(1) selecting intra-frame prediction or inter-frame prediction based on a prediction mode, to obtain a prediction pixel of the CU;

(2) transforming and quantizing a residual between an original pixel and the prediction pixel of the CU, to obtain a transformation coefficient; and performing dequantization and inverse transformation on the transformation coefficient, to obtain a reconstruction residual;

(3) performing loop filtering after the prediction pixel and the reconstruction residual of the CU are added, to obtain a reconstruction pixel value of the CU; and (4) performing entropy coding on information such as the prediction mode and the transformation coefficient of the CU, to generate a bitstream of the CU. A bitstream of a CTU includes a bitstream of each CU.

In the foregoing coding solution, the CTU can be split in a plurality of split modes. Therefore, fewer split levels are used and more CU shapes are obtained. In addition, the candidate split mode set may be further set. In this way, when a relatively large quantity of split modes are allowed in the candidate split mode set, the coder can try a relatively large quantity of split modes, and therefore compression performance is relatively good. When a relatively small quantity of split modes are allowed in the candidate split mode set, the coder can try a relatively small quantity of split modes, and therefore operation complexity is relatively low.

In conclusion, in the coding and decoding solutions in this application, the CTU is coded and decoded by using a multi-split mode-based hybrid coding split tree structure. In the coding and decoding solutions, more CU shapes than those in a quadtree split mode are allowed; fewer split levels than those in a binary tree split mode are used; CUs with aspect ratios of 1, 2, and 4 that improve coding efficiency most are reserved in a split mode of cascading a quadtree and a binary tree, simpler split mode information than that in the split mode of cascading a quadtree and a binary tree is used, and more split modes than those in the split mode of cascading a quadtree and a binary tree are allowed; and under same coding complexity, higher compression efficiency than that in the QTBT split mode can be achieved.

Figure 8:
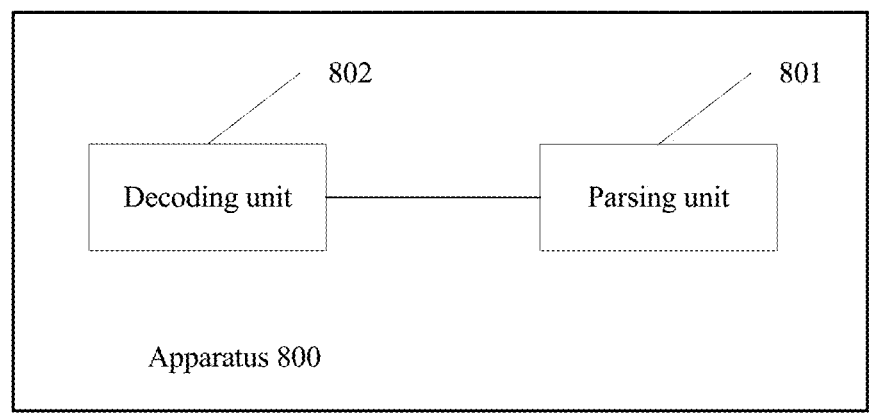
FIG. 8 is a structural diagram of a video image decoding apparatus according to an embodiment of this application.

According to the foregoing embodiments, as shown in FIG. 8, an embodiment of this application provides a video image decoding apparatus 800. A coding tree node is used to indicate a to-be-decoded rectangular image area in a video image, a lower-level node is used to indicate a part of the to-be-decoded rectangular image area, image areas indicated by different lower-level nodes do not overlap each other, and when the coding tree node is a coding unit of the video image, the coding tree node does not include the lower-level node. As shown in FIG. 8, the apparatus 800 includes a parsing unit 801 and a decoding unit 802.

The parsing unit 801 is configured to: parse split mode information of the coding tree node in a bitstream; obtain a split mode of the coding tree node from a candidate split mode set of the coding tree node based on the split mode information, where an aspect ratio of the coding tree node is 1 and a width of the coding tree node is greater than a preset threshold, the candidate split mode set includes a first split mode for indicating that the coding tree node is the coding unit of the video image, a second split mode for determining that the coding tree node includes two equal-sized lower-level nodes with an aspect ratio of 2, a third split mode for determining that the coding tree node includes two equal-sized lower-level nodes with an aspect ratio of 0.5, and a fourth split mode for determining that the coding tree node includes four equal-sized lower-level nodes with an aspect ratio of 1, and when an aspect ratio of the lower-level node is 1 and a width of the lower-level node is greater than the preset threshold, a candidate split mode set of the lower-level node is the same as the candidate split mode set of the coding tree node; and parse the bitstream to obtain coding information of the coding tree node.

The decoding unit 802 is configured to reconstruct a pixel value of the coding tree node based on the split mode information and the coding information of the coding tree node.

Optionally, the split mode is used to determine at least one of a quantity of lower-level nodes included in the coding tree node, or sizes and distribution of the lower-level nodes.

Optionally, the width of the coding tree node is four times of M pixels, and M is a positive integer; by using an upper left point of the coding tree node as an origin, a rightward direction is a horizontal positive direction, and a downward direction is a vertical positive direction; and the candidate split mode set further includes:

a fifth split mode for determining that the coding tree node includes the lower-level node for which (0, 0) is used as an upper left point, a width is two times of the M pixels, and a height is two times of the M pixels, the lower-level node for which (2M, 0) is used as an upper left point, a width is two times of the M pixels, and a height is two times of the M pixels, the lower-level node for which (0, 2M) is used as an upper left point, a width is two times of the M pixels, and a height is two times of the M pixels, and the lower-level node for which (2M, 2M) is used as an upper left point, a width is two times of the M pixels, and a height is two times of the M pixels; or a sixth split mode for determining that the coding tree node includes the lower-level node for which (0, 0) is used as an upper left point, a width is two times of the M pixels, and a height is two times of the M pixels, the lower-level node for which (2M, 0) is used as an upper left point, a width is two times of the M pixels, and a height is two times of the M pixels, and the lower-level node for which (0, 2M) is used as an upper left point, a width is four times of the M pixels, and a height is two times of the M pixels; or a seventh split mode for determining that the coding tree node includes the lower-level node for which (0, 0) is used as an upper left point, a width is four times of the M pixels, and a height is two times of the M pixels, the lower-level node for which (0, 2M) is used as an upper left point, a width is two times of the M pixels, and a height is two times of the M pixels, and the lower-level node for which (2M, 2M) is used as an upper left point, a width is two times of the M pixels, and a height is two times of the M pixels; or an eighth split mode for determining that the coding tree node includes the lower-level node for which (0, 0) is used as an upper left point, a width is two times of the M pixels, and a height is two times of the M pixels, the lower-level node for which (0, 2M) is used as an upper left point, a width is two times of the M pixels, and a height is two times of the M pixels, and the lower-level node for which (0, 2M) is used as an upper left point, a width is two times of the M pixels, and a height is four times of the M pixels; or a ninth split mode for determining that the coding tree node includes the lower-level node for which (0, 0) is used as an upper left point, a width is two times of the M pixels, and a height is four times of the M pixels, the lower-level node for which (2M, 0) is used as an upper left point, a width is two times of the M pixels, and a height is two times of the M pixels, and the lower-level node for which (2M, 2M) is used as an upper left point, a width is two times of the M pixels, and a height is two times of the M pixels; or a tenth split mode for determining that the coding tree node includes the lower-level node for which (0, 0) is used as an upper left point, a width is two times of the M pixels, and a height is two times of the M pixels, the lower-level node for which (2M, 0) is used as an upper left point, a width is two times of the M pixels, and a height is two times of the M pixels, the lower-level node for which (0, 2M) is used as an upper left point, a width is four times of the M pixels, and a height is the M pixels, and the lower-level node for which (0, 3M) is used as an upper left point, a width is four times of the M pixels, and a is the M pixels; or an eleventh split mode for determining that the coding tree node includes the lower-level node for which (0, 0) is used as an upper left point, a width is four times of the M pixels, and a height is the M pixels, the lower-level node for which (0, M) is used as an upper left point, a width is four times of the M pixels, and a height is the M pixels, the lower-level node for which (0, 2M) is used as an upper left point, a width is two times of the M pixels, and a height is two times of the M pixels, and the lower-level node for which (2M, 2M) is used as an upper left point, a width is two times of the M pixels, and a height is two times of the M pixels; or a twelfth split mode for determining that the coding tree node includes the lower-level node for which (0, 0) is used as an upper left point, a width is two times of the M pixels, and a height is two times of the M pixels, the lower-level node for which (0, 2M) is used as an upper left point, a width is two times of the M pixels, and a height is two times of the M pixels, the lower-level node for which (2M, 0) is used as an upper left point, a width is the M pixels, and a height is four times of the M pixels, and the lower-level node for which (3M, 0) is used as an upper left point, a width is the M pixels, and a height is four times of the M pixels; or a thirteenth split mode for determining that the coding tree node includes the lower-level node for which (0, 0) is used as an upper left point, a width is the M pixels, and a height is four times of the M pixels, the lower-level node for which (M, 0) is used as an upper left point, a width is the M pixels, and a height is four times of the M pixels, the lower-level node for which (2M, 0) is used as an upper left point, a width is two times of the M pixels, and a height is two times of the M pixels, and the lower-level node for which (2M, 2M) is used as an upper left point, a width is two times of the M pixels, and a height is two times of the M pixels; or a fourteenth split mode for determining that the coding tree node includes the lower-level node for which (0, 0) is used as an upper left point, a width is four times of the M pixels, and a height is the M pixels, the lower-level node for which (0, M) is used as an upper left point, a width is four times of the M pixels, and a height is the M pixels, the lower-level node for which (0, 2M) is used as an upper left point, a width is four times of the M pixels, and a height is the M pixels, and the lower-level node for which (0, 3M) is used as an upper left point, a width is four times of the M pixels, and a height is the M pixels; or a fifteenth split mode for determining that the coding tree node includes the lower-level node for which (0, 0) is used as an upper left point, a width is the M pixels, and a height is four times of the M pixels, the lower-level node for which (0, M) is used as an upper left point, a width is the M pixels, and a height is four times of the M pixels, the lower-level node for which (0, 2M) is used as an upper left point, a width is the M pixels, and a height is four times of the M pixels, and the lower-level node for which (0, 3M) is used as an upper left point, a width is the M pixels, and a height is four times of the M pixels; or a sixteenth split mode for determining that the coding tree node includes the lower-level node for which (0, 0) is used as an upper left point, a width is four times of the M pixels, and a height is the M pixels, the lower-level node for which (0, M) is used as an upper left point, a width is four times of the M pixels, and a height is two times of the M pixels, and the lower-level node for which (0, 3M) is used as an upper left point, a width is four times of the M pixels, and a height is the M pixels; or a seventeenth split mode for determining that the coding tree node includes the lower-level node for which (0, 0) is used as an upper left point, a width is the M pixels, and a height is four times of the M pixels, the lower-level node for which (M, 0) is used as an upper left point, a width is two times of the M pixels, and a height is four times of the M pixels, and the lower-level node for which (3M, 0) is used as an upper left point, a width is the M pixels, and a height is four times of the M pixels.

Optionally, that the split mode is used to determine lower-level nodes included in the coding tree node further includes:

the split mode is used to determine a decoding order of a plurality of lower-level nodes included in the coding tree node; and correspondingly, the fourth split mode includes a first submode of the fourth split mode in which four equal-sized lower-level nodes with an aspect ratio of 1 are decoded in a clockwise order, and a second submode of the fourth split mode in which four equal-sized lower-level nodes with an aspect ratio of 1 are decoded in a counterclockwise order, where the candidate split mode set includes at least the first submode of the fourth split mode.

Optionally, the split mode information is indicated by a first syntax element, and the first syntax element is used to indicate an identifier of the obtained split mode in the candidate split mode set.

Optionally, the split mode information is indicated by a second syntax element and a third syntax element, the second syntax element is used to determine whether the obtained split mode is the first split mode, and when the second syntax element is used to determine that the obtained split mode is not the first split mode, the third syntax element is used to indicate an identifier of the obtained split mode in the candidate split mode set except the first split mode.

Optionally, when parsing the bitstream to obtain the coding information of the coding tree node, the parsing unit 801 is specifically configured to:

when the obtained split mode is not the first split mode, parse the bitstream to obtain coding information of the lower-level node of the coding tree node, where when an aspect ratio of the lower-level node is 1 and a width of the lower-level node is greater than the preset threshold, the coding information of the lower-level node includes split mode information of the lower-level node; and correspondingly, when reconstructing the pixel value of the coding tree node based on the split mode information and the coding information of the coding tree node, the decoding unit 802 is specifically configured to:

when the obtained split mode is not the first split mode, reconstruct a pixel value of the lower-level node based on the coding information of the lower-level node.

Optionally, before parsing the split mode information of the coding tree node in the bitstream, the parsing unit 801 is further configured to:

parse indication information of the candidate split mode set in the bitstream, where the indication information is used to indicate a split mode included in the candidate split mode set.

Optionally, before parsing the split mode information of the coding tree node in the bitstream, the parsing unit 801 is further configured to:

determine that the coding tree node is located within an image range of the video image.

It should be noted that, for function implementation and an interaction manner of each unit of the apparatus 800 in this embodiment of this application, further refer to descriptions in a related method embodiment. Details are not described herein again.

Figure 9:
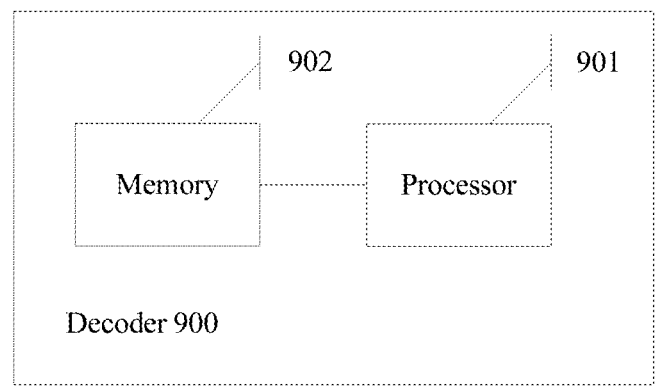
FIG. 9 is a structural diagram of a video image decoder according to an embodiment of this application.

Based on a same inventive concept, an embodiment of this application further provides a decoder 900. As shown in FIG. 9, the decoder 900 includes a processor 901 and a memory 902. Program code used to execute the solutions of the present application is stored in the memory 902, and is used to instruct the processor 901 to perform the video image decoding method shown in FIG. 4.

In this application, code corresponding to the method shown in FIG. 4 is built into a chip by performing design programming on the processor, so that when the chip runs, the method shown in FIG. 4 can be performed.

Figure 10:
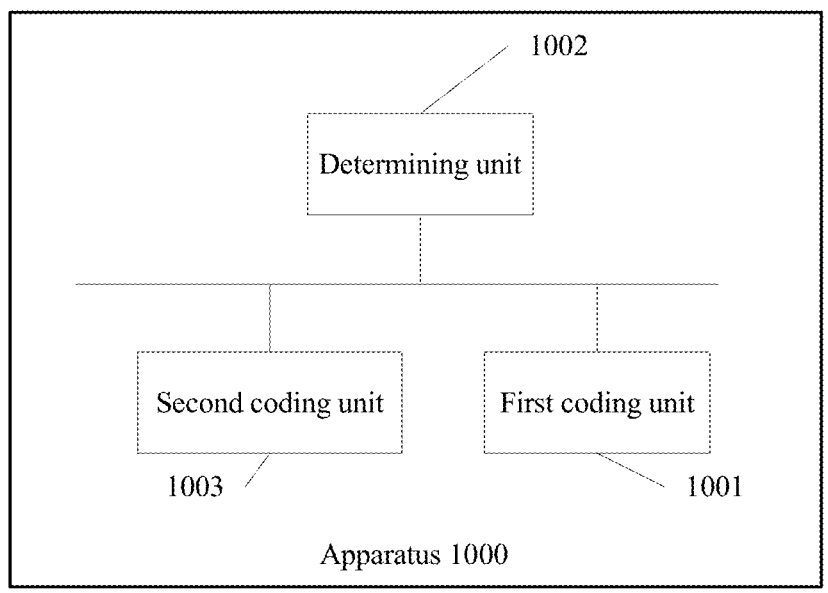
FIG. 10 is a structural diagram of a video image coding apparatus according to an embodiment of this application.

According to the foregoing embodiments, as shown in FIG. 10, an embodiment of this application provides a video image coding apparatus 1000. As shown in FIG. 10, the apparatus 1000 includes a first coding unit 1001, a determining unit 1002, and a second coding unit 1003.

The first coding unit 1001 is configured to code a coding tree node in a video image based on at least one split mode in a specified candidate split mode set of the coding tree node, to obtain a rate-distortion cost corresponding to each of the at least one split mode, where the rate-distortion cost is a sum of rate-distortion costs of all coding units obtained based on corresponding split modes, an aspect ratio of the coding tree node is 1 and a width of the coding tree node is greater than a preset threshold, the candidate split mode set includes a first split mode for indicating that the coding tree node is a basic coding unit of the video image, a second split mode for determining that the coding tree node includes two equal-sized lower-level nodes with an aspect ratio of 2, a third split mode for determining that the coding tree node includes two equal-sized lower-level nodes with an aspect ratio of 0.5, and a fourth split mode for determining that the coding tree node includes four equal-sized lower-level nodes with an aspect ratio of 1, and when an aspect ratio of the lower-level node is 1 and a width of the lower-level node is greater than the preset threshold, a candidate split mode set of the lower-level node is the same as the candidate split mode set of the coding tree node.

The determining unit 1002 is configured to: determine a split mode with a minimum rate-distortion cost as a target split mode of the coding tree node; and determine, based on the target split mode, each coding unit included in the coding tree node.

The second coding unit 1003 is configured to code each coding unit to obtain a bitstream and a reconstruction image that are corresponding to the coding tree node.

Optionally, when determining, based on the target split mode, each coding unit included in the coding tree node, the determining unit 1002 is specifically configured to:

determine, based on the target split mode of the coding tree node, N subnodes included in the coding tree node;

when the N subnodes include a square node and a width of an image area corresponding to the square node is greater than the preset threshold, perform coding based on the at least one split mode in the candidate split mode set, to obtain the rate-distortion cost corresponding to each of the at least one split mode;

determine the split mode with the minimum rate-distortion cost as a target split mode of the square node; and determine, based on the target split mode of the square node, a next-level square node included in the square node until there is no next-level square node or a width of an image area corresponding to the determined next-level square node is equal to the preset threshold, to obtain each coding unit included in the coding tree node.

It should be noted that, for function implementation and an interaction manner of each unit of the apparatus 1000 in this embodiment of this application, further refer to descriptions in a related method embodiment. Details are not described herein again.

It should be understood that division of the units in the apparatus 1000 and the apparatus 800 is merely logical function division. In actual implementation, all or some of the units may be integrated into one physical entity, or the units may be physically separated. For example, the foregoing units may be separately disposed processing elements, or may be integrated into a chip of the coding device for implementation, or may be stored in a memory element of the coder in a form of program code and invoked by a processing element of the coding device to implement functions of the foregoing units. In addition, the units may be integrated or may be implemented separately. The processing element may be an integrated circuit chip and has a signal processing capability. In an implementation process, steps in the foregoing methods or the foregoing units can be implemented by using a hardware integrated logical circuit in the processing element, or by using instructions in a form of software. The processing element may be a general-purpose processor, such as a central processing unit (CPU), or may be configured as one or more integrated circuits that perform the foregoing methods, such as one or more application-specific integrated circuits (ASIC), one or more digital signal processors (DSP), or one or more field-programmable gate arrays (FPGA).

Figure 11:
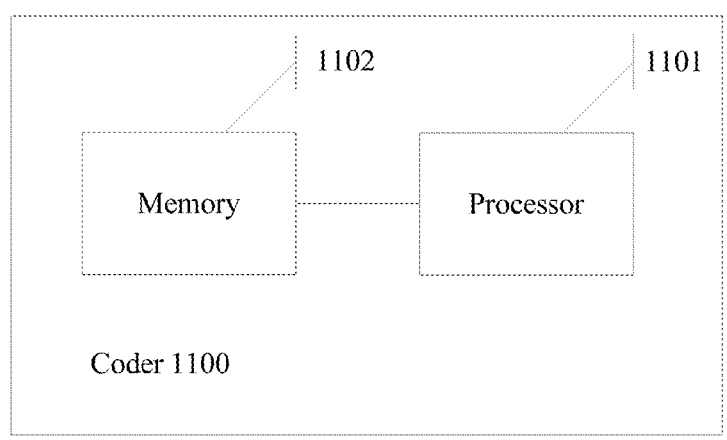
FIG. 11 is a structural diagram of a video image coder according to an embodiment of this application.

Based on a same inventive concept, as shown in FIG. 11, an embodiment of this application further provides a coder 1100. As shown in FIG. 11, the coder 1100 includes a processor 1101 and a memory 1102. Program code used to execute the solutions of the present application is stored in the memory 1102, and is used to instruct the processor 1101 to perform the video image coding method shown in FIG. 7.

In this application, code corresponding to the method shown in FIG. 7 is built into a chip by performing design programming on the processor, so that when the chip runs, the method shown in FIG. 7 can be performed.

It may be understood that the processor in the coder 1100 and the decoder 900 in the embodiments of this application may be a CPU, a DSP, an ASIC, or one or more integrated circuits configured to control program execution in the solutions of the present application. One or more memories included in a computer system may be a read-only memory (ROM) or another type of static storage device that is capable of storing static information and a static instruction, a random access memory (RAM) or another type of dynamic storage device that is capable of storing information and an instruction, or may be a magnetic disk memory. These memories are connected to the processor by using a bus, or may be connected to the processor by using a dedicated connection cable.

A person skilled in the art should understand that the embodiments of this application may be provided as a method, a system, or a computer program product. Therefore, the embodiments of this application may use a form of hardware only embodiments, software only embodiments, or embodiments with a combination of software and hardware. Moreover, the embodiments of this application may use a form of a computer program product that is implemented on one or more computer-usable storage media (including but not limited to a disk memory, a CD-ROM, an optical memory, and the like) that include computer-usable program code.

The embodiments of this application are described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Apparently, a person skilled in the art can make various modifications and variations to embodiments of this application without departing from the spirit and scope of this application. This application is intended to cover these modifications and variations provided that they fall within the scope of protection defined by the following claims and their equivalent technologies.

What is claimed is:

1. A video image decoding method, wherein a coding tree node is used to indicate a to-be-decoded rectangular image area in a video image, a lower-level node is used to indicate a part of the to-be-decoded rectangular image area, image areas indicated by different lower-level nodes do not overlap each other, and when the coding tree node is a coding unit of the video image, the coding tree node does not comprise the lower-level node, the method comprising:

parsing split mode information of the coding tree node in a bitstream;

obtaining a split mode of the coding tree node from a candidate split mode set of the coding tree node based on the split mode information, wherein an aspect ratio of the coding tree node is 1 and a width of the coding tree node is greater than a preset threshold, the candidate split mode set comprises a first split mode for indicating that the coding tree node is the coding unit of the video image, a second split mode for determining that the coding tree node comprises two equal-sized lower-level nodes with an aspect ratio of 2, a third split mode for determining that the coding tree node comprises two equal-sized lower-level nodes with an aspect ratio of 0.5, and a fourth split mode for determining that the coding tree node comprises four equal-sized lower-level nodes with an aspect ratio of 1, and when an aspect ratio of the lower-level node is 1 and a width of the lower-level node is greater than the preset threshold, a candidate split mode set of the lower-level node is the same as the candidate split mode set of the coding tree node;

parsing the bitstream to obtain coding information of the coding tree node; and reconstructing a pixel value of the coding tree node based on the split mode information and the coding information of the coding tree node.

2. The method according to claim 1, where the split mode is used to determine at least one of a quantity of lower-level nodes comprised in the coding tree node, or sizes and distribution of the lower-level nodes.

3. The method according to claim 1, wherein the width of the coding tree node is four times of M pixels, and M is a positive integer; by using an upper left point of the coding tree node as an origin, a rightward direction is a horizontal positive direction, and a downward direction is a vertical positive direction; and the candidate split mode set further comprises:

a fifth split mode for determining that the coding tree node comprises the lower-level node for which (0, 0) is used as an upper left point, a width is two times of the M pixels, and a height is two times of the M pixels, the lower-level node for which (2M, 0) is used as an upper left point, a width is two times of the M pixels, and a height is two times of the M pixels, the lower-level node for which (0, 2M) is used as an upper left point, a width is two times of the M pixels, and a height is two times of the M pixels, and the lower-level node for which (2M, 2M) is used as an upper left point, a width is two times of the M pixels, and a height is two times of the M pixels; or a sixth split mode for determining that the coding tree node comprises the lower-level node for which (0, 0) is used as an upper left point, a width is two times of the M pixels, and a height is two times of the M pixels, the lower-level node for which (2M, 0) is used as an upper left point, a width is two times of the M pixels, and a height is two times of the M pixels, and the lower-level node for which (0, 2M) is used as an upper left point, a width is four times of the M pixels, and a height is two times of the M pixels; or a seventh split mode for determining that the coding tree node comprises the lower-level node for which (0, 0) is used as an upper left point, a width is four times of the M pixels, and a height is two times of the M pixels, the lower-level node for which (0, 2M) is used as an upper left point, a width is two times of the M pixels, and a height is two times of the M pixels, and the lower-level node for which (2M, 2M) is used as an upper left point, a width is two times of the M pixels, and a height is two times of the M pixels; or an eighth split mode for determining that the coding tree node comprises the lower-level node for which (0, 0) is used as an upper left point, a width is two times of the M pixels, and a height is two times of the M pixels, the lower-level node for which (0, 2M) is used as an upper left point, a width is two times of the M pixels, and a height is two times of the M pixels, and the lower-level node for which (0, 2M) is used as an upper left point, a width is two times of the M pixels, and a height is four times of the M pixels; or a ninth split mode for determining that the coding tree node comprises the lower-level node for which (0, 0) is used as an upper left point, a width is two times of the M pixels, and a height is four times of the M pixels, the lower-level node for which (2M, 0) is used as an upper left point, a width is two times of the M pixels, and a height is two times of the M pixels, and the lower-level node for which (2M, 2M) is used as an upper left point, a width is two times of the M pixels, and a height is two times of the M pixels; or a tenth split mode for determining that the coding tree node comprises the lower-level node for which (0, 0) is used as an upper left point, a width is two times of the M pixels, and a height is two times of the M pixels, the lower-level node for which (2M, 0) is used as an upper left point, a width is two times of the M pixels, and a height is two times of the M pixels, the lower-level node for which (0, 2M) is used as an upper left point, a width is four times of the M pixels, and a height is the M pixels, and the lower-level node for which (0, 3M) is used as an upper left point, a width is four times of the M pixels, and a height is the M pixels; or an eleventh split mode for determining that the coding tree node comprises the lower-level node for which (0, 0) is used as an upper left point, a width is four times of the M pixels, and a height is the M pixels, the lower-level node for which (0, M) is used as an upper left point, a width is four times of the M pixels, and a height is the M pixels, the lower-level node for which (0, 2M) is used as an upper left point, a width is two times of the M pixels, and a height is two times of the M pixels, and the lower-level node for which (2M, 2M) is used as an upper left point, a width is two times of the M pixels, and a height is two times of the M pixels; or a twelfth split mode for determining that the coding tree node comprises the lower-level node for which (0, 0) is used as an upper left point, a width is two times of the M pixels, and a height is two times of the M pixels, the lower-level node for which (0, 2M) is used as an upper left point, a width is two times of the M pixels, and a height is two times of the M pixels, the lower-level node for which (2M, 0) is used as an upper left point, a width is the M pixels, and a height is four times of the M pixels, and the lower-level node for which (3M, 0) is used as an upper left point, a width is the M pixels, and a height is four times of the M pixels; or a thirteenth split mode for determining that the coding tree node comprises the lower-level node for which (0, 0) is used as an upper left point, a width is the M pixels, and a height is four times of the M pixels, the lower-level node for which (M, 0) is used as an upper left point, a width is the M pixels, and a height is four times of the M pixels, the lower-level node for which (2M, 0) is used as an upper left point, a width is two times of the M pixels, and a height is two times of the M pixels, and the lower-level node for which (2M, 2M) is used as an upper left point, a width is two times of the M pixels, and a height is two times of the M pixels; or a fourteenth split mode for determining that the coding tree node comprises the lower-level node for which (0, 0) is used as an upper left point, a width is four times of the M pixels, and a height is the M pixels, the lower-level node for which (0, M) is used as an upper left point, a width is four times of the M pixels, and a height is the M pixels, the lower-level node for which (0, 2M) is used as an upper left point, a width is four times of the M pixels, and a height is the M pixels, and the lower-level node for which (0, 3M) is used as an upper left point, a width is four times of the M pixels, and a height is the M pixels; or a fifteenth split mode for determining that the coding tree node comprises the lower-level node for which (0, 0) is used as an upper left point, a width is the M pixels, and a height is four times of the M pixels, the lower-level node for which (0, M) is used as an upper left point, a width is the M pixels, and a height is four times of the M pixels, the lower-level node for which (0, 2M) is used as an upper left point, a width is the M pixels, and a height is four times of the M pixels, and the lower-level node for which (0, 3M) is used as an upper left point, a width is the M pixels, and a height is four times of the M pixels; or a sixteenth split mode for determining that the coding tree node comprises the lower-level node for which (0, 0) is used as an upper left point, a width is four times of the M pixels, and a height is the M pixels, the lower-level node for which (0, M) is used as an upper left point, a width is four times of the M pixels, and a height is two times of the M pixels, and the lower-level node for which (0, 3M) is used as an upper left point, a width is four times of the M pixels, and a height is the M pixels; or a seventeenth split mode for determining that the coding tree node comprises the lower-level node for which (0, 0) is used as an upper left point, a width is the M pixels, and a height is four times of the M pixels, the lower-level node for which (M, 0) is used as an upper left point, a width is two times of the M pixels, and a height is four times of the M pixels, and the lower-level node for which (3M, 0) is used as an upper left point, a width is the M pixels, and a height is four times of the M pixels.

4. The method according to claim 1, wherein that the split mode is used to determine lower-level nodes comprised in the coding tree node, the method further comprises:
the split mode is used to determine a decoding order of a plurality of lower-level nodes comprised in the coding tree node; and
correspondingly, the fourth split mode comprises a first submode of the fourth split mode in which four equal-sized lower-level nodes with an aspect ratio of 1 are decoded in a clockwise order, and a second submode of the fourth split mode in which four equal-sized lower-level nodes with an aspect ratio of 1 are decoded in a counterclockwise order, wherein the candidate split mode set comprises at least the first submode of the fourth split mode.

5. The method according to claim 1, wherein the split mode information is indicated by a first syntax element, and the first syntax element is used to indicate an identifier of the obtained split mode in the candidate split mode set.

6. The method according to claim 1, wherein the split mode information is indicated by a second syntax element and a third syntax element, the second syntax element is used to determine whether the obtained split mode is the first split mode, and when the second syntax element is used to determine that the obtained split mode is not the first split mode, the third syntax element is used to indicate an identifier of the obtained split mode in the candidate split mode set except the first split mode.

7. The method according to claim 1, wherein the parsing the bitstream to obtain coding information of the coding tree node comprises:
   when the obtained split mode is not the first split mode, parsing the bitstream to obtain coding information of the lower-level node of the coding tree node, wherein when an aspect ratio of the lower-level node is 1 and a width of the lower-level node is greater than the preset threshold, the coding information of the lower-level node comprises split mode information of the lower-level node; and
   correspondingly, the reconstructing a pixel value of the coding tree node based on the split mode information and the coding information of the coding tree node comprises:
   when the obtained split mode is not the first split mode, reconstructing a pixel value of the lower-level node based on the coding information of the lower-level node.

8. The method according to claim 1, wherein before the parsing split mode information of the coding tree node in a bitstream, the method further comprises:
   parsing indication information of the candidate split mode set in the bitstream, wherein the indication information is used to indicate a split mode comprised in the candidate split mode set.

9. The method according to claim 1, wherein before the parsing split mode information of the coding tree node in a bitstream, the method further comprises:
   determining that the coding tree node is located within an image range of the video image.

10. A video image coding method, comprising:
    coding a coding tree node in a video image based on at least one split mode in a specified candidate split mode set of the coding tree node, to obtain a rate-distortion cost corresponding to each of the at least one split mode, wherein the rate-distortion cost is a sum of rate-distortion costs of all coding units obtained based on corresponding split modes, an aspect ratio of the coding tree node is 1 and a width of the coding tree node is greater than a preset threshold, the candidate split mode set comprises a first split mode for indicating that the coding tree node is a basic coding unit of the video image, a second split mode for determining that the coding tree node comprises two equal-sized lower-level nodes with an aspect ratio of 2, a third split mode for determining that the coding tree node comprises two equal-sized lower-level nodes with an aspect ratio of 0.5, and a fourth split mode for determining that the coding tree node comprises four equal-sized lower-level nodes with an aspect ratio of 1, and when an aspect ratio of the lower-level node is 1 and a width of the lower-level node is greater than the preset threshold, a candidate split mode set of the lower-level node is the same as the candidate split mode set of the coding tree node;
    determining a split mode with a minimum rate-distortion cost as a target split mode of the coding tree node; and
    determining, based on the target split mode, each coding unit comprised in the coding tree node, and coding each coding unit to obtain a bitstream and a reconstruction image that are corresponding to the coding tree node.

11. The method according to claim 10, wherein the determining, based on the target split mode, each coding unit comprised in the coding tree node comprises:
    determining, based on the target split mode of the coding tree node, N subnodes comprised in the coding tree node;
    when the N subnodes comprise a square node and a width of an image area corresponding to the square node is greater than the preset threshold, performing coding based on the at least one split mode in the candidate split mode set, to obtain the rate-distortion cost corresponding to each of the at least one split mode;
    determining the split mode with the minimum rate-distortion cost as a target split mode of the square node; and
    determining, based on the target split mode of the square node, a next-level square node comprised in the square node until there is no next-level square node or a width of an image area corresponding to the determined next-level square node is equal to the preset threshold, to obtain each coding unit comprised in the coding tree node.

12. A video image decoding apparatus, wherein a coding tree node is used to indicate a to-be-decoded rectangular image area in a video image, a lower-level node is used to indicate a part of the to-be-decoded rectangular image area, image areas indicated by different lower-level nodes do not overlap each other, and when the coding tree node is a coding unit of the video image, the coding tree node does not comprise the lower-level node, the apparatus comprising:
    a non-transitory memory having processor-executable instructions stored thereon; and
    a processor, coupled to the memory, configured to execute the processor-executable instructions to facilitate:
    parse split mode information of the coding tree node in a bitstream; obtain a split mode of the coding tree node from a candidate split mode set of the coding tree node based on the split mode information, wherein an aspect ratio of the coding tree node is 1 and a width of the coding tree node is greater than a preset threshold, the candidate split mode set comprises a first split mode for indicating that the coding tree node is the coding unit of the video image, a second split mode for determining that the coding tree node comprises two equal-sized lower-level nodes with an aspect ratio of 2, a third split mode for determining that the coding tree node comprises two equal-sized lower-level nodes with an aspect ratio of 0.5, and a fourth split mode for determining that the coding tree node comprises four equal-sized lower-level nodes with an aspect ratio of 1, and when an aspect ratio of the lower-level node is 1 and a width of the lower-level node is greater than the preset threshold, a candidate split mode set of the lower-level node is the same as the candidate split mode set of the coding tree node; and parse the bitstream to obtain coding information of the coding tree node; and
    reconstruct a pixel value of the coding tree node based on the split mode information and the coding information of the coding tree node.

13. The apparatus according to claim 12, wherein the split mode is used to determine at least one of a quantity of lower-level nodes included in the coding tree node, and sizes and distribution of the lower-level nodes.

14. The apparatus according to claim 12, wherein the width of the coding tree node is four times of M pixels, and M is a positive integer; by using an upper left point of the coding tree node as an origin, a rightward direction is a horizontal positive direction, and a downward direction is a vertical positive direction; and the candidate split mode set further comprises:

a fifth split mode for determining that the coding tree node comprises the lower-level node for which (0, 0) is used as an upper left point, a width is two times of the M pixels, and a height is two times of the M pixels, the lower-level node for which (2M, 0) is used as an upper left point, a width is two times of the M pixels, and a height is two times of the M pixels, the lower-level node for which (0, 2M) is used as an upper left point, a width is two times of the M pixels, and a height is two times of the M pixels, and the lower-level node for which (2M, 2M) is used as an upper left point, a width is two times of the M pixels, and a height is two times of the M pixels; or a sixth split mode for determining that the coding tree node comprises the lower-level node for which (0, 0) is used as an upper left point, a width is two times of the M pixels, and a height is two times of the M pixels, the lower-level node for which (2M, 0) is used as an upper left point, a width is two times of the M pixels, and a height is two times of the M pixels, and the lower-level node for which (0, 2M) is used as an upper left point, a width is four times of the M pixels, and a height is two times of the M pixels; or a seventh split mode for determining that the coding tree node comprises the lower-level node for which (0, 0) is used as an upper left point, a width is four times of the M pixels, and a height is two times of the M pixels, the lower-level node for which (0, 2M) is used as an upper left point, a width is two times of the M pixels, and a height is two times of the M pixels, and the lower-level node for which (2M, 2M) is used as an upper left point, a width is two times of the M pixels, and a height is two times of the M pixels; or an eighth split mode for determining that the coding tree node comprises the lower-level node for which (0, 0) is used as an upper left point, a width is two times of the M pixels, and a height is two times of the M pixels, the lower-level node for which (0, 2M) is used as an upper left point, a width is two times of the M pixels, and a height is two times of the M pixels, and the lower-level node for which (0, 2M) is used as an upper left point, a width is two times of the M pixels, and a height is four times of the M pixels; or a ninth split mode for determining that the coding tree node comprises the lower-level node for which (0, 0) is used as an upper left point, a width is two times of the M pixels, and a height is four times of the M pixels, the lower-level node for which (2M, 0) is used as an upper left point, a width is two times of the M pixels, and a height is two times of the M pixels, and the lower-level node for which (2M, 2M) is used as an upper left point, a width is two times of the M pixels, and a height is two times of the M pixels; or a tenth split mode for determining that the coding tree node comprises the lower-level node for which (0, 0) is used as an upper left point, a width is two times of the M pixels, and a height is two times of the M pixels, the lower-level node for which (2M, 0) is used as an upper left point, a width is two times of the M pixels, and a height is two times of the M pixels, the lower-level node for which (0, 2M) is used as an upper left point, a width is four times of the M pixels, and a height is the M pixels, and the lower-level node for which (0, 3M) is used as an upper left point, a width is four times of the M pixels, and a is the M pixels; or an eleventh split mode for determining that the coding tree node comprises the lower-level node for which (0, 0) is used as an upper left point, a width is four times of the M pixels, and a height is the M pixels, the lower-level node for which (0, M) is used as an upper left point, a width is four times of the M pixels, and a height is the M pixels, the lower-level node for which (0, 2M) is used as an upper left point, a width is two times of the M pixels, and a height is two times of the M pixels, and the lower-level node for which (2M, 2M) is used as an upper left point, a width is two times of the M pixels, and a height is two times of the M pixels; or a twelfth split mode for determining that the coding tree node comprises the lower-level node for which (0, 0) is used as an upper left point, a width is two times of the M pixels, and a height is two times of the M pixels, the lower-level node for which (0, 2M) is used as an upper left point, a width is two times of the M pixels, and a height is two times of the M pixels, the lower-level node for which (2M, 0) is used as an upper left point, a width is the M pixels, and a height is four times of the M pixels, and the lower-level node for which (3M, 0) is used as an upper left point, a width is the M pixels, and a height is four times of the M pixels; or a thirteenth split mode for determining that the coding tree node comprises the lower-level node for which (0, 0) is used as an upper left point, a width is the M pixels, and a height is four times of the M pixels, the lower-level node for which (M, 0) is used as an upper left point, a width is the M pixels, and a height is four times of the M pixels, the lower-level node for which (2M, 0) is used as an upper left point, a width is two times of the M pixels, and a height is two times of the M pixels, and the lower-level node for which (2M, 2M) is used as an upper left point, a width is two times of the M pixels, and a height is two times of the M pixels; or a fourteenth split mode for determining that the coding tree node comprises the lower-level node for which (0, 0) is used as an upper left point, a width is four times of the M pixels, and a height is the M pixels, the lower-level node for which (0, M) is used as an upper left point, a width is four times of the M pixels, and a height is the M pixels, the lower-level node for which (0, 2M) is used as an upper left point, a width is four times of the M pixels, and a height is the M pixels, and the lower-level node for which (0, 3M) is used as an upper left point, a width is four times of the M pixels, and a height is the M pixels; or a fifteenth split mode for determining that the coding tree node comprises the lower-level node for which (0, 0) is used as an upper left point, a width is the M pixels, and a height is four times of the M pixels, the lower-level node for which (0, M) is used as an upper left point, a width is the M pixels, and a height is four times of the M pixels, the lower-level node for which (0, 2M) is used as an upper left point, a width is the M pixels, and a height is four times of the M pixels, and the lower-level node for which (0, 3M) is used as an upper left point, a width is the M pixels, and a height is four times of the M pixels; or a sixteenth split mode for determining that the coding tree node comprises the lower-level node for which (0, 0) is used as an upper left point, a width is four times of the M pixels, and a height is the M pixels, the lower-level node for which (0, M) is used as an upper left point, a width is four times of the M pixels, and a height is two times of the M pixels, and the lower-level node for which (0, 3M) is used as an upper left point, a width is four times of the M pixels, and a height is the M pixels; or a seventeenth split mode for determining that the coding tree node comprises the lower-level node for which (0, 0) is used as an upper left point, a width is the M pixels, and a height is four times of the M pixels, the lower-level node for which (M, 0) is used as an upper left point, a width is two times of the M pixels, and a height is four times of the M pixels, and the lower-level node for which (3M, 0) is used as an upper left point, a width is the M pixels, and a height is four times of the M pixels.

15. The apparatus according to claim 12, wherein that the split mode is used to determine lower-level nodes comprised in the coding tree node, the method further comprises:
the split mode is used to determine a decoding order of a plurality of lower-level nodes comprised in the coding tree node; and
correspondingly, the fourth split mode comprises a first submode of the fourth split mode in which four equal-sized lower-level nodes with an aspect ratio of 1 are decoded in a clockwise order, and a second submode of the fourth split mode in which four equal-sized lower-level nodes with an aspect ratio of 1 are decoded in a counterclockwise order, wherein the candidate split mode set comprises at least the first submode of the fourth split mode.

16. The apparatus according to claim 12, wherein the split mode information is indicated by a first syntax element, and the first syntax element is used to indicate an identifier of the obtained split mode in the candidate split mode set.

17. The apparatus according to claim 12, wherein the split mode information is indicated by a second syntax element and a third syntax element, the second syntax element is used to determine whether the obtained split mode is the first split mode, and when the second syntax element is used to determine that the obtained split mode is not the first split mode, the third syntax element is used to indicate an identifier of the obtained split mode in the candidate split mode set except the first split mode.

18. The apparatus according to claim 12, wherein when parsing the bitstream to obtain the coding information of the coding tree node, the processor is configured to:
when the obtained split mode is not the first split mode, parse the bitstream to obtain coding information of the lower-level node of the coding tree node, wherein when an aspect ratio of the lower-level node is 1 and a width of the lower-level node is greater than the preset threshold, the coding information of the lower-level node comprises split mode information of the lower-level node; and
correspondingly, when reconstructing the pixel value of the coding tree node based on the split mode information and the coding information of the coding tree node, the processor is configured to:
when the obtained split mode is not the first split mode, reconstruct a pixel value of the lower-level node based on the coding information of the lower-level node.

19. The apparatus according to claim 12, wherein before parsing the split mode information of the coding tree node in the bitstream, the processor is further configured to:
parse indication information of the candidate split mode set in the bitstream, wherein the indication information is used to indicate a split mode comprised in the candidate split mode set.

20. The apparatus according to claim 12, wherein before parsing the split mode information of the coding tree node in the bitstream, the processor is further configured to:
determine that the coding tree node is located within an image range of the video image.

* * * * *